(12) United States Patent
Cooper et al.

(10) Patent No.: US 8,422,249 B2
(45) Date of Patent: Apr. 16, 2013

(54) APPARATUS FOR A MICROINVERTER PARTICULARLY SUITED FOR USE IN SOLAR POWER INSTALLATIONS

(75) Inventors: Frank G. Cooper, Dix Hills, NY (US); Eric J. Hoffman, Middleton, WI (US); Richard MacArthur, Franklin Square, NY (US)

(73) Assignee: Direct Grid Technologies, LLC, Edgewood, NY (US)

( * ) Notice: Subject to any disclaimer, the term of this patent is extended or adjusted under 35 U.S.C. 154(b) by 57 days.

(21) Appl. No.: 13/199,319

(22) Filed: Aug. 25, 2011

(65) Prior Publication Data
US 2013/0051092 A1 Feb. 28, 2013

(51) Int. Cl.
*H02M 3/335* (2006.01)

(52) U.S. Cl.
USPC .............................. 363/17; 363/98; 363/132

(58) Field of Classification Search .............. 363/16, 363/17, 97, 98, 124, 131, 132
See application file for complete search history.

(56) References Cited

U.S. PATENT DOCUMENTS

| | | | | |
|---|---|---|---|---|
| 4,445,049 | A | 4/1984 | Steigerwald | 307/45 |
| 4,956,762 | A | 9/1990 | Loveness et al. | 363/65 |
| 5,283,726 | A | 2/1994 | Wilkerson | 363/41 |
| 5,373,433 | A | 12/1994 | Thomas | 363/43 |
| 5,719,758 | A | 2/1998 | Nakata et al. | 363/98 |
| 5,973,491 | A | 10/1999 | Onizuka et al. | 323/906 |
| 5,977,659 | A | 11/1999 | Takehara et al. | 307/85 |
| 6,282,111 | B1 | 8/2001 | Illingworth | 363/98 |
| 6,429,546 | B1 * | 8/2002 | Ropp et al. | 307/31 |
| 7,579,715 | B2 * | 8/2009 | Seelig et al. | 307/75 |
| 2006/0267523 | A1 * | 11/2006 | Seelig et al. | 318/16 |
| 2007/0247876 | A1 | 10/2007 | Garabandic | |
| 2008/0037291 | A1 | 2/2008 | Fukumoto | |

(Continued)

FOREIGN PATENT DOCUMENTS

| | | |
|---|---|---|
| WO | WO 2007/115893 | 10/2007 |
| WO | WO 2008/102552 | 8/2008 |
| WO | WO 2008/144548 | 11/2008 |
| WO | WO 2009/004613 | 1/2009 |

OTHER PUBLICATIONS

E. Sambuis et al, TMS320C200 DSP Controllers: A Perfect Fit for Solar Power Inverters, Texas Instruments, Application Report, SPRAAE3, May 2006, 9 pp.

*Primary Examiner* — Jessica Han
(74) *Attorney, Agent, or Firm* — Steven S. Rubin, Esq.; Moritt Hock & Hamroff LLP

(57) ABSTRACT

A microinverter is disclosed for use in a solar power installation. The microinverter incorporates a voltage-to-current control loop that initially converts output current produced by a photovoltaic panel into a pulse width modulated output synchronized and phase-locked to the utility grid voltage. The duty cycle of that modulated output is specified by output power internally requested from the microinverter. This modulated output is converted into a full-wave rectified unipolar waveform that is converted, through a Commutator, into a bipolar AC output that is also phase-locked and synchronized to the grid voltage. The commutator uses an H-bridge composed of four FETs, with each of two diagonally-oriented pairs of these FETs being advantageously switched on substantially at zero-crossing points in the grid voltage. Switching these FETs during times of zero current and voltage, and switching each pair on for substantially an entire half-cycle of grid voltage reduces switching loss and power dissipation of the FETs and ensures that these FETs remain substantially unaffected by transients which might appear in the grid voltage.

6 Claims, 23 Drawing Sheets

U.S. PATENT DOCUMENTS

| | | |
|---|---|---|
| 2008/0205096 A1* | 8/2008 | Lai et al. .................... 363/40 |
| 2008/0285317 A1 | 11/2008 | Rotzoll |
| 2009/0034299 A1 | 2/2009 | Lev |
| 2009/0097280 A1 | 4/2009 | Wu et al. |
| 2009/0168460 A1 | 7/2009 | Huang et al. |
| 2012/0042588 A1* | 2/2012 | Erickson, Jr. .............. 52/173.3 |

* cited by examiner

DC Converter

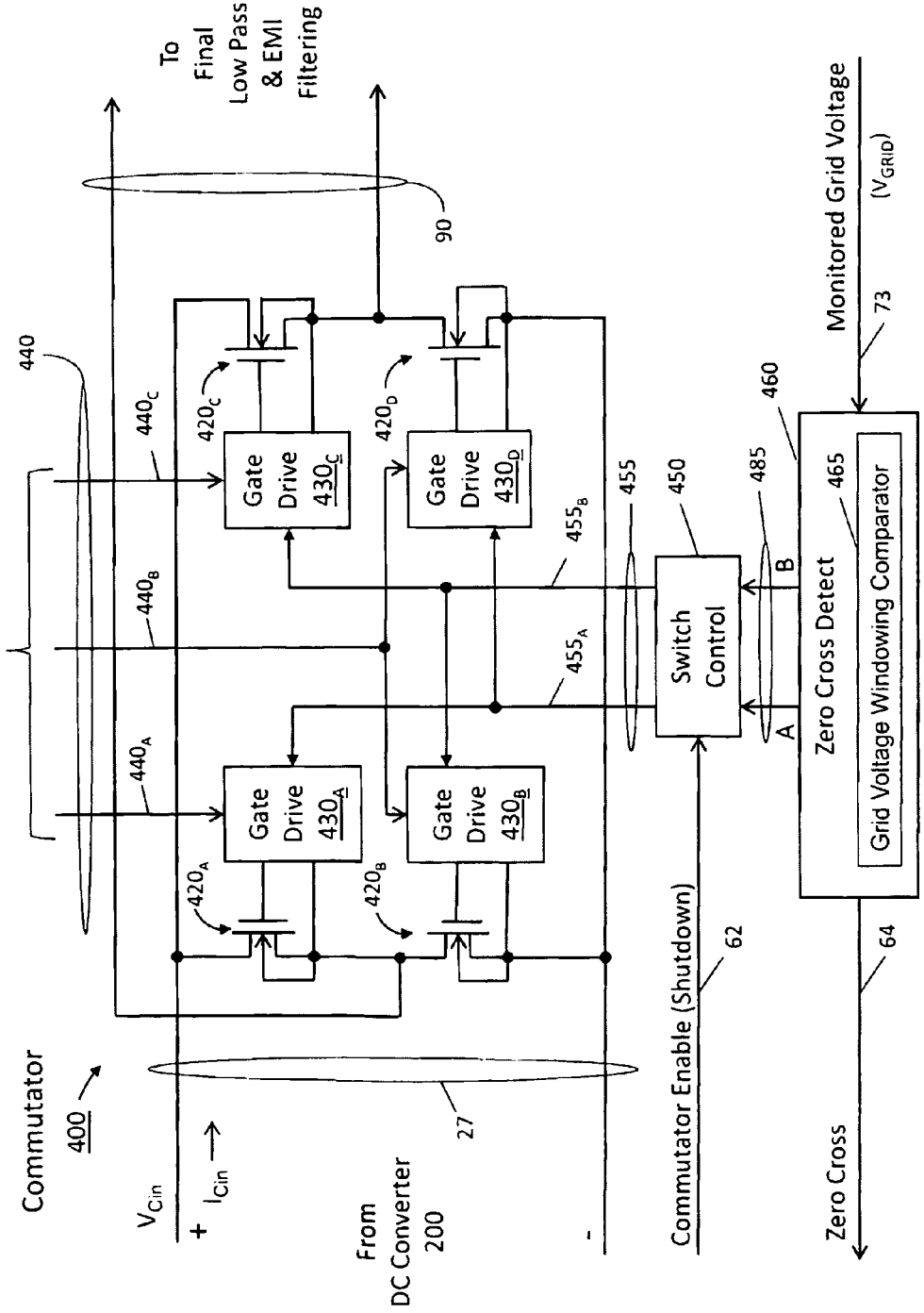

Grid Voltage Windowing Comparator 465

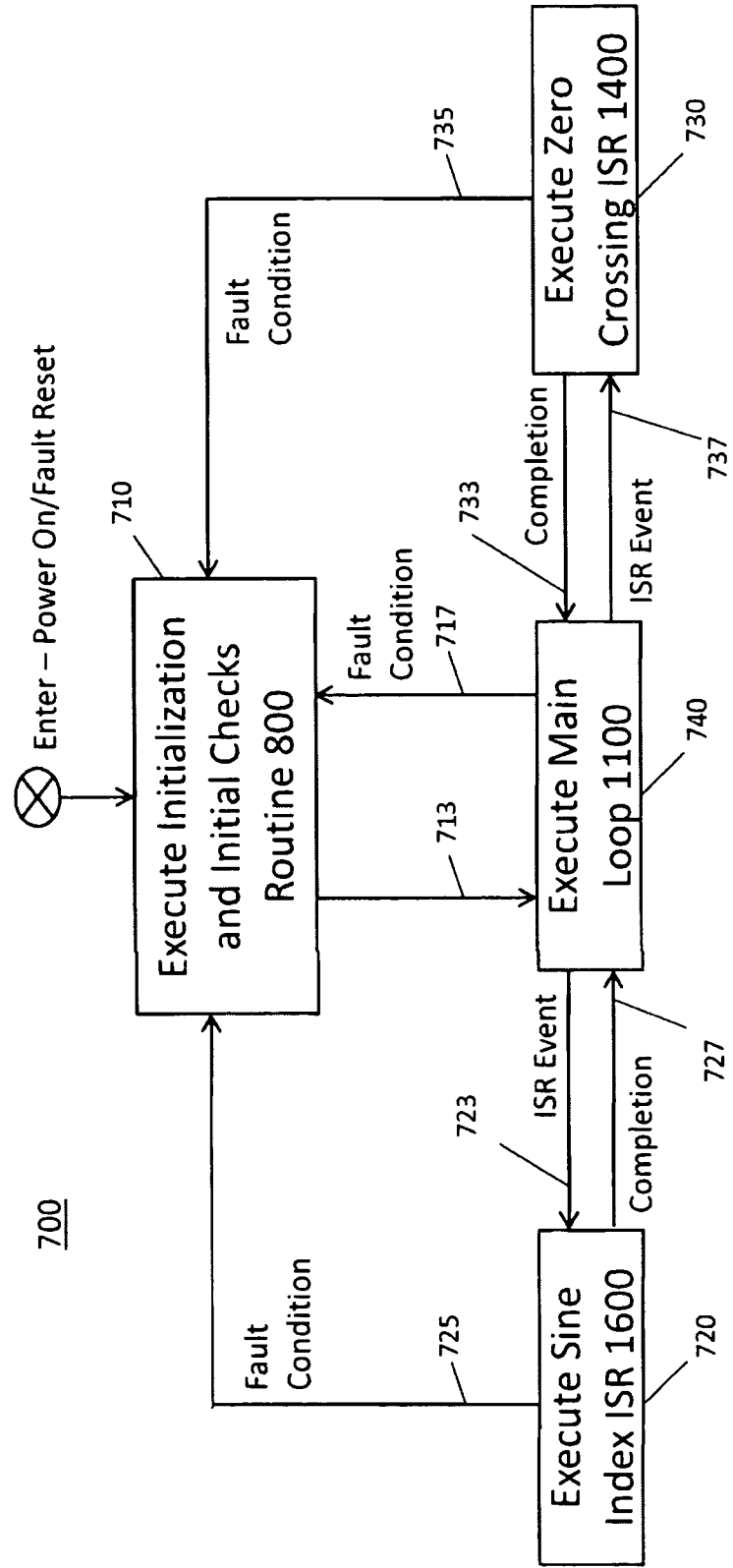

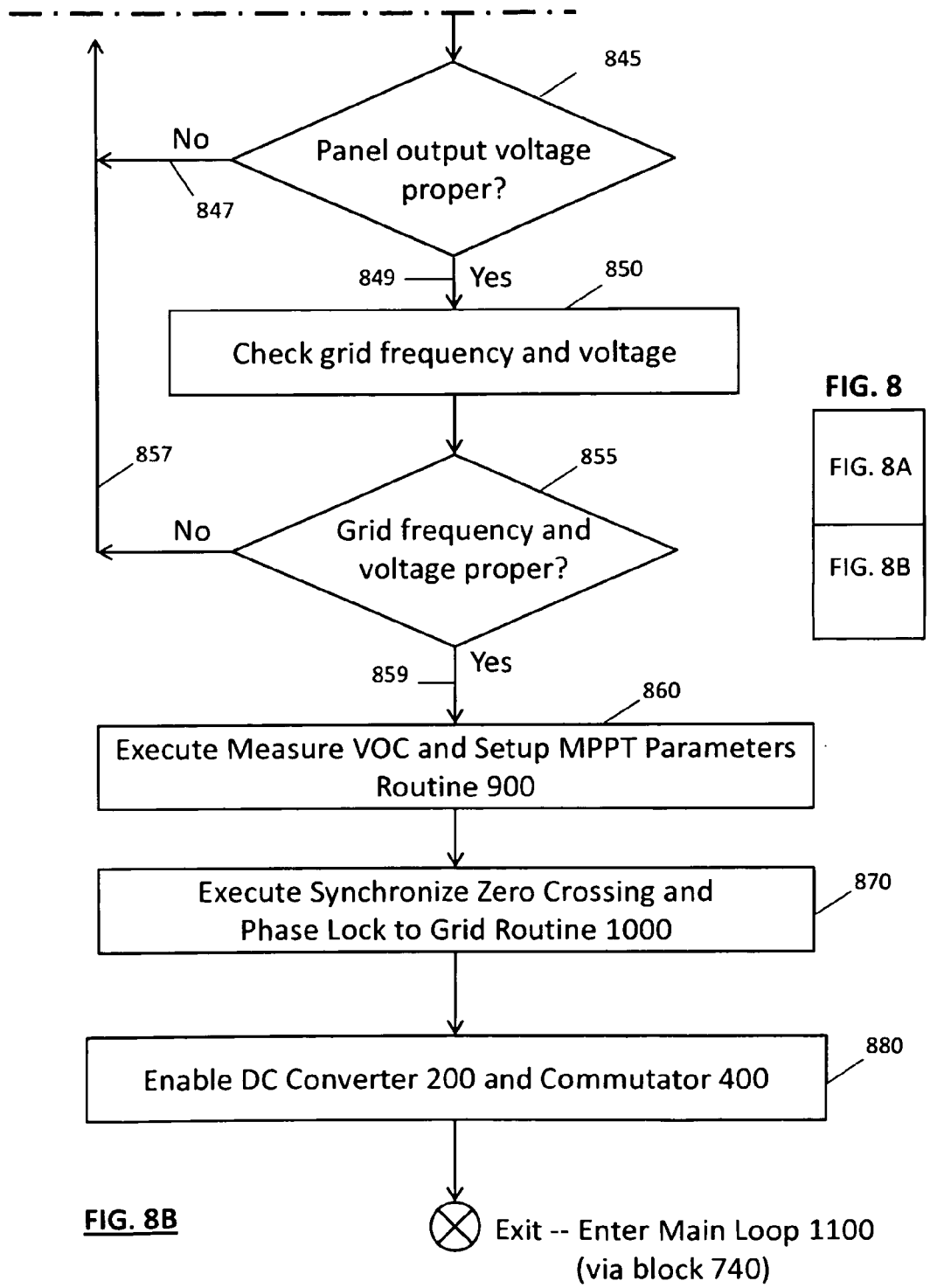

SYNCHRONIZE ZERO CROSSING & PHASE LOCK TO GRID ROUTINE 1000

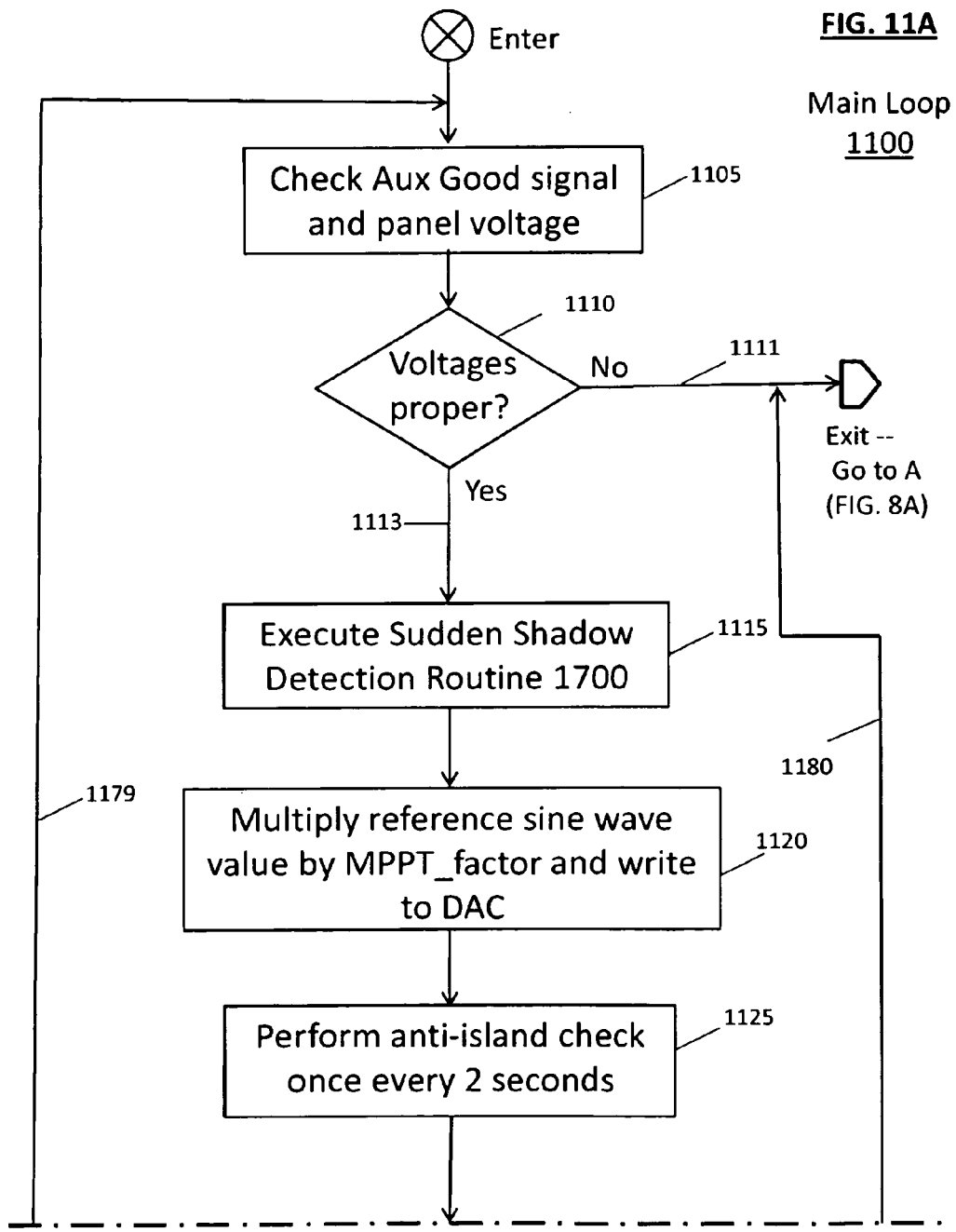

VARIABLE GAIN CURRENT CONTROL LOOP

APPARATUS FOR A MICROINVERTER PARTICULARLY SUITED FOR USE IN SOLAR POWER INSTALLATIONS

BACKGROUND OF THE DISCLOSURE

1. Field of the Invention

The invention relates to a microinverter primarily, though not exclusively, intended for use in a solar power installation and specifically one powered by a photovoltaic solar panel.

2. Description of the Prior Art

Currently, an increasing worldwide emphasis is being placed on exploiting clean, renewable energy sources rather than fossil fuels. One such energy source that is receiving considerable attention in the marketplace is solar energy. It is readily abundant, weather permitting, in a wide multitude of locales and across widely differing climates.

In essence, an amount of solar energy is harvested and converted into electrical power which, in turn, is either used to power local loads and/or fed to a power (utility) grid for consumption at remote locales from the point at which the energy was harvested. To do so, a matrix of inter-connected photovoltaic elements, called a "solar panel", is aimed at the sun and converts incident solar radiation into a direct current (DC) output. Oftentimes, this DC output is converted through a companion microinverter, into appropriate alternating current (AC) line power, to provide an electrical power source for powering local, line-powered devices and/or for supplying the resultant AC power as input to a utility grid. The microinverter generally employs internal DC-to-DC converter and chopper stages with the DC-to-DC converter being used to convert, with ideally relatively low loss, the DC output voltage produced by the solar panel to a level suitable for efficient conversion to an power-line AC level, such as 120 volts at 60 Hz.

Oftentimes, a solar power installation utilizes individual assemblies of one or two panels that are mounted to a racking system. Each panel has an array of serially-connected photovoltaic (PV) cells. The output of the panels in each single assembly is connected to a microinverter which, itself, is mounted to the assembly and situated directly behind the racking system. Each such assembly has rather limited space to accommodate its corresponding microinverter.

Some conventional microinverters which are commercially available in the marketplace often utilize a design such as that described in an application report: "TMS 320C2000 DSP Controllers: A Perfect Fit for Solar Power Inverters", Texas Instruments Application Report SPRAE3-May 2006, pages 1-8 and particularly FIGS. 3 and 4 on page 4 thereof. Unfortunately, this design suffers from various drawbacks which tend to limit its utility and attractiveness.

First, this design relies on using one or more, and often two, inductors, operating at a relatively high frequency, as primary internal energy storage devices, with the stored energy typically being routed by a steering diode into a capacitor. Unfortunately, the stored energy is not regulated particularly well and also operating an inductor at such a frequency causes increased electrical loss. Further, since the energy capacity of an inductor is limited by its physical size, this design does not scale well in terms of its own overall physical size. Specifically, the overall size of such a microinverter is very dependent on the size of the inductors. While suitable inductors for use in a microinverter that generates approximately a hundred watts of output power are sufficiently small, those for microinverters handling several hundred watts and more can be rather large thus, in turn, forcing the microinverter to have a corresponding large overall size. As the overall size increases, use of such microinverters becomes increasingly impractical for certain applications and simply unsuited for installation in space-limited solar panel assemblies. Moreover, the inductor-based design tends, relatively speaking, to exhibit poor output regulation and poor efficiency.

Second, this design relies on using two high-frequency choppers, rather than one, thus causing increased electrical switching losses. Further, the second (output) chopper is formed of an H-bridge, of four FETs (field effect transistors). The FETs are controlled through pulse width modulation (PWM) to form a sine wave output from input DC power. By virtue of high frequency switching under PWM control, each FET incurs switching losses, and dissipates several watts of power (e.g., 7 or 8 watts, when providing 170 watts of output power), thus further decreasing the overall efficiency of the microinverter. Moreover, the output of the FETs are basically coupled (though typically through an inductor and other components) directly to the AC utility line. Consequently the FETs, during their OFF-to-ON and ON-to-OFF transitions, are quite sensitive to and can be readily damaged by source-drain over-voltage conditions caused by transients existing on the utility line. This, in turn, may lead to premature device failures and hence compromise long-term reliability of the microinverter.

In this and similar designs, the two high frequency chopper stages must be preceded by an energy storage capacitor. These are typically large value aluminum electrolytic capacitors, generally viewed as a weak link in reliability. The capacitors source pulse currents demanded by their associated chopper transistors. The capacitor preceding the second stage inverter has an additional burden of absorbing pulse currents from the output of the first inverter stage. High current and high temperature (exacerbated by self-heating) appear to be key factors which degrade capacitor lifetime and overall system reliability. Hence, in the conventional designs, electrolytic capacitors are used twice. Further, Voltage transients on the utility grid can pass through the conducting H-Bridge FETs and into the energy storage capacitor. Since a large value capacitor presents a relatively low impedance, voltage transients from the utility grid tend to result in high current transients within the output stage. Stress caused by repeated high currents tends to reduce overall system reliability.

Furthermore, utilities require that, for connection to the grid, microinverters need to achieve as close to a unity power factor as realistically possible. To do so, conventional microinverters, such as that taught by the Texas Instruments SPRAAE3 application report and others like it, control their output voltage to track the grid voltage. Unfortunately, the grid voltage often contains distortions, be it transients, glitches, spikes or other undesired short-term variations, from a clean sinusoidal waveform. As such, the output of those microinverters will be controlled, via PWM, to similarly track those distortions, thus disadvantageously producing an output voltage that effectively reinforces their occurrence. Further, these designs often include both positive and negative feedback loops which, in turn, tend to make those units susceptible of breaking into oscillation and hence causing unstable operation.

Moreover, various conventional designs do not include galvanic isolation and thus present possible safety issues, hence potentially frustrating certification through certain testing and certifying organizations.

Therefore, a need exists in the art for a microinverter primarily, though not exclusively, suited for use in solar power applications that does not utilize an inductor as a primary energy storage device, and that exhibits relatively high and increased overall efficiency, stability, robustness and reliability over conventional designs. Such a microinverter should not produce an output that reinforces distortions appearing on the utility grid and should implement galvanic isolation. Ideally, such a microinverter should also be readily scalable to handle increased power levels without significant corresponding increases in its overall physical size.

SUMMARY OF THE INVENTION

Through our inventive microinverter, we advantageously satisfy this need and overcome the deficiencies in the art.

In accordance with our presently inventive teachings, our inventive microinverter incorporates a voltage-to-current control loop that initially converts output current produced by the PV panel into a pulse width modulated output synchronized and phase-locked to the utility grid voltage. The duty cycle of that modulated output is specified by the output current then requested from the microinverter and specifically by an internal programmed microcontroller. This modulated output is, in turn, converted, through rectification and filtering, into a full-wave rectified AC waveform that itself is converted, through a Commutator stage, into an AC output that is also phase-locked and synchronized to the utility grid voltage. The Commutator uses an H-bridge composed of four field effect transistors (FETs), with each of two diagonally-oriented pairs of these FETs being advantageously switched on at substantially at zero-crossing points in the utility grid voltage waveform. By switching each pair of these FETs on for substantially an entire half-cycle of grid voltage, not only does this advantageously substantially reduce the switching loss and power dissipation of the FETs to merely their resistive ($I^2R$) loss but also these FETs remain substantially unaffected by transients (including spikes, glitches, etc.) and other such sudden abnormalities which might appear in the utility line voltage.

The inventive microinverter through a software-implemented maximum power point tracking (MPPT) procedure ensures that the PV panel is operated at a point (MPPT point) on its characteristic curve at which its peak output power can be harvested. This procedure relies on using either of two algorithms, namely "Perturb and Observe" or "Incremental Conductance", with the selection between the two being based on the magnitude of output power then being supplied by the panel, to repeatedly and reliably locate the MPPT point and maintain subsequent operation of the panel at that point. As that point changes with normal variations in panel illumination over the course of a day (i.e., above an amount which yields a corresponding predefined minimum amount of panel output voltage), the MPPT procedure will track those changes and adjust the MPPT point accordingly.

Further, inasmuch as the output produced by the microinverter is current controlled, i.e., by the amount of current then being requested, that output does not follow any abnormalities then appearing in the utility grid voltage. Advantageously, the sinusoidal output produced by the microinverter, which is fully synchronized and phase-locked to the grid frequency, contains substantially less distortion, abnormalities and other artifacts than does the utility grid voltage. As increasing numbers of the inventive microinverter are connected, in parallel and via a common point, to supply power to the utility grid, those inverters will collectively and effectively suppress transients and other abnormalities then appearing at that point on the grid. Also, by eliminating any positive feedback loops and only acting as a source and not a sink of current, the inventive microinverter is considerably more stable in its operation than are many conventional designs.

Moreover, to provide galvanic isolation—which is missing in many conventional designs, the inventive microinverter contains an isolation transformer. A chopper stage, implemented also through an H-bridge arrangement of four chopper FETs and located on a primary side of the transformer converts the incoming DC current supplied by the PV panel into the pulse width modulated output. Given the galvanic isolation and the relatively high impedance at high frequencies presented by the filtering located on the secondary side of the transformer (where the pulse width modulated output is converted into full-wave rectified AC), power line transients and other such sudden abnormalities appearing in the grid voltage essentially do not reach the chopper FETs. Thus, these FETs are substantially protected from those adverse effects.

Furthermore, in accordance with our inventive teachings, the current control loop monitors the current through the primary side chopper. The microcontroller will automatically shut-down the chopper stage and turn off all the Commutator FETs within the same cycle in which the over-current condition occurred, thus implementing "pulse-by-pulse" current detection. Specifically, if a shadow was suddenly cast on the PV panel which, in turn, caused its output current to suddenly decrease and, as a consequence, the output current then actually being produced by the microinverter to decrease below that being requested by the microcontroller, a hard-shutdown would be instructed during which the microinverter would completely shut down its operation, automatically re-start and re-initialize itself and gradually increase its output current from a predefined minimum value to the prior requested amount. Alternatively, if for whatever reason the PV panel were producing an excessive amount of current (occurring on the primary side of the transformer), this would cause a soft shutdown condition during which the microinverter would automatically re-initialize itself after expiration of a suitable time delay interval and return to generating the requested output current.

In addition, the inventive microinverter advantageously incorporates anti-islanding detection through which the microcontroller repeatedly and frequently dithers the output power level (typically once every 2 seconds) and determines whether the utility grid voltage responsively decreases. During ordinary operation of the utility grid, the grid voltage is quite rigid and would hardly decrease, if at all. However, should the grid voltage sufficiently decrease, then it is likely that the grid voltage has failed, such as by, e.g., a downed line. To prevent the microinverter from supplying power into an otherwise non-powered utility line, the microcontroller executes a hard shutdown which persists throughout that failure condition.

Advantageously and as a feature of our invention, the inventive microinverter design is very easily scalable by simply connecting additional microinverters in parallel to a common supply point on an electrical grid. Each microinverter operates independently of any others.

As another feature, our microinverter uses only one energy storage capacitor and does not rely on stored magnetic energy in the power converter stage. While our design can be readily scaled upward in terms of its output power capability, this feature advantageously permits the physical size of the entire microinverter to increase at a far lower rate than would conventional designs for the same increase in output power. Thus, our inventive microinverter finds more widespread application, particularly in relatively high-power but volume-limited installations, than would units based on conventional designs.

BRIEF DESCRIPTION OF THE DRAWINGS

The teachings of the present invention can be readily understood by considering the following detailed description in conjunction with the accompanying drawings, in which:

FIG. 4 depicts a block diagram of Commutator 400 shown in FIG. 1;

FIG. 7 depicts a flowchart of Overall Execution Threads 700 executed by Microcontroller 510 shown in FIG. 5;

FIGS. 8A-8B collectively depict a flowchart of Initialization and Initial Checks Routine 800 which is executed within Overall Execution Threads 700 shown in FIG. 7; with FIG. 8 depicting the correct alignment of the drawing sheets for FIGS. 8A-8B;

To facilitate understanding, identical reference numerals have been used, where possible, to designate identical elements that are common to two or more of the figures.

DETAILED DESCRIPTION

After considering the following description, those skilled in the art will clearly realize that various teachings of the present invention could be utilized not only in a microinverter designed primarily for use with a photovoltaic (PV) panel but in any inverter designed to be powered by a direct current (DC) voltage source. Moreover, while these teachings will be described, in the ensuing discussion, in the context of an operational microinverter which has been developed by the Applicants and designed to generate approximately 460 watts of alternating current (AC) power, these teachings can form the basis of a design of a microinverter that can be scaled upward or downward, as desired, to handle higher or lower levels of output power, respectively.

A. Hardware

1. Overall Architecture

Figure 1:
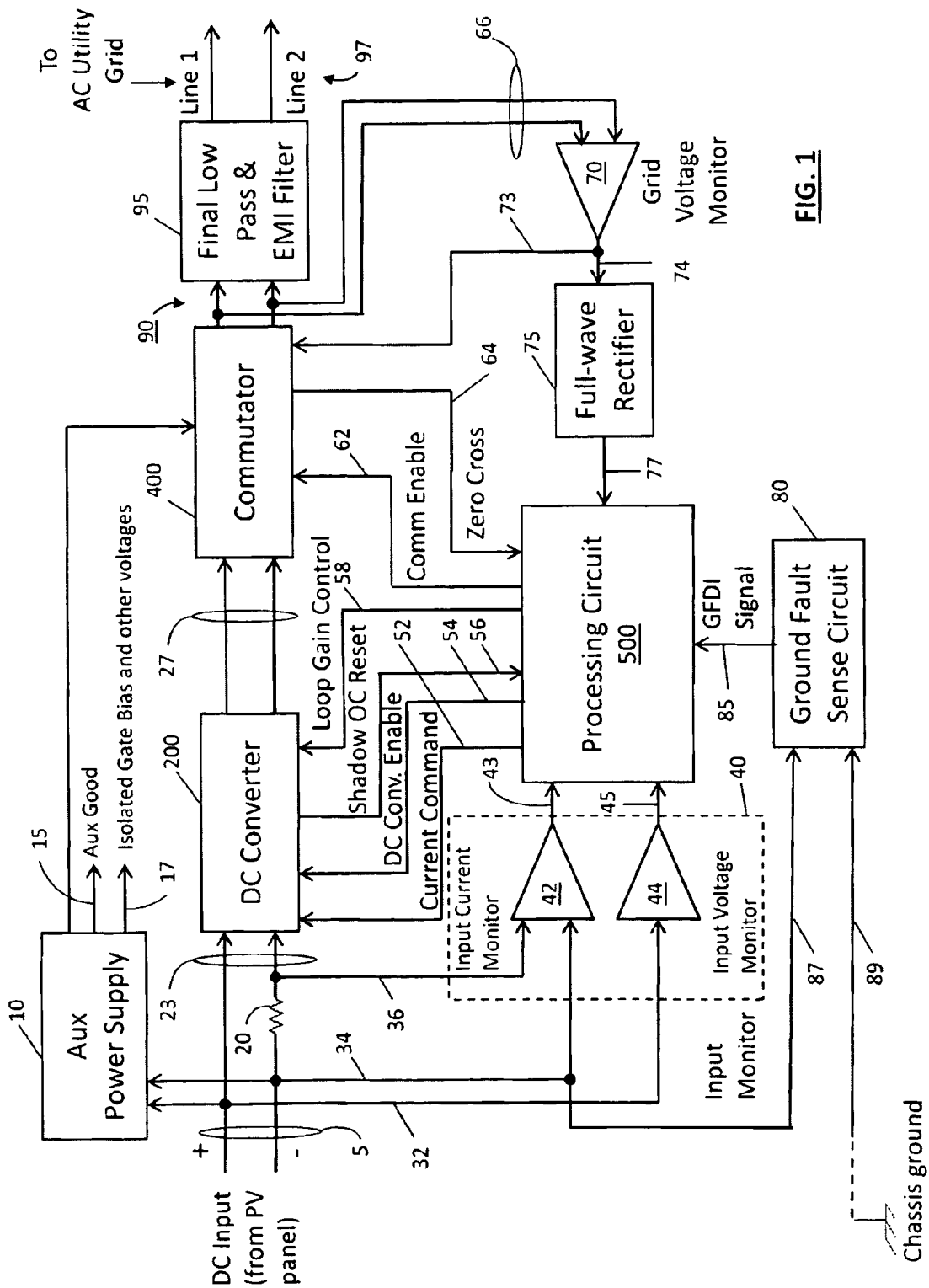
FIG. 1 depicts a high-level overall block diagram of inventive Microinverter 100.

FIG. 1 depicts a high-level overall block diagram of the inventive microinverter 100.

As shown, Microinverter 100 has, as its main constituents: DC Converter 200, Commutator 400, Grid Voltage Monitor 70, Full-wave Rectifier 75, Input Monitor 40 and Processing Circuit 500. The microinverter also contains Final Low Pass and EMI (electro-magnetic interference) Filter 95, Ground Fault Sense Circuit 80 and Aux (Auxiliary) Power Supply 10.

DC output generated by the PV panel is applied, via input leads 5, in parallel to DC Converter 200 (via leads 23), Input Monitor 40 and Aux Power Supply 10. DC Converter 200, (which is described in further detail below in conjunction with FIG. 2), is essentially a voltage-to-current converter that provides galvanic isolation. It converts the DC voltage generated by the PV panel into a full-wave rectified, unipolar current waveform. As will be discussed below in conjunction with FIG. 2, the amplitude of that current waveform is determined through control of a PWM (pulse width modulated) duty cycle of a chopped version, internal to the converter, of the output DC current produced by the PV panel. The duty cycle is a function of an amount of output current then being requested by Processing Circuit 500 as output from the microinverter, with that current waveform being synchronized with and phase-locked to zero-crossings in the AC grid voltage. The unipolar output current is then applied, via leads 27, as input to Commutator 400. The Commutator essentially converts the unipolar, full-wave rectified current waveform into a single-phase, bipolar AC waveform. The Commutator, which is discussed below in conjunction with FIG. 4, contains four power FETs connected in an H-bridge configuration. The bridge contains two opposing pairs of FETs, with each pair being located along a corresponding diagonal in the bridge.

The output of the microinverter is connected directly, via leads 97 (Line 1 and Line 2), to a utility grid to source the single-phase AC power, fully synchronized to the voltage and frequency of the utility grid voltage, back into the grid.

In accordance with our inventive teachings, each pair of FETs in the Commutator is successively switched (commutated) on and off at and fully synchronized to corresponding zero crossings of the utility (grid) voltage. Both FET pairs are operated on a 180-degree staggered basis with respect to each other, i.e., one pair is switched on while the other off, and so forth to implement fully sinusoidal AC output current. Such zero-crossing based switching advantageously reduces power consumption in each of the FETs to predominantly, if not substantially solely, resistive losses, as each FET is not appreciably, if at all, operated in its linear domain. Such operation also provides significantly increased reliability as each FET, by being in a fully conductive state, is substantially unaffected by any transient or artifact that might then appear on the grid voltage and propagate back, through filter 95, into the Commutator.

The resulting AC sinusoidal current waveform produced by the Commutator is applied, through leads 90, to Final Low Pass and EMI filter 95. This filter, which is conventional and through its low pass characteristic, removes switching noise and other artifacts from the current waveform which, by virtue of the output current being synchronously applied to the grid, might otherwise be imparted to the utility grid and cause radio and other electromagnetic interference in other nearby equipment (either connected to the grid or not). The output of filter 95 is the output of the microinverter, and, as such, is connected via leads 97, to the utility grid.

The voltage appearing at the output of Commutator 400, which is an unfiltered version of the grid voltage, is applied, via leads 90 and 66, to Grid Voltage Monitor 70. This monitor suitably scales, conditions and buffers this output voltage and applies a resulting signal, via leads 73 and 74, to Commutator 400 and, via lead 74, to Full-wave Rectifier 75. The Commutator, in turn, detects zero crossings in that signal. The Full-wave Rectifier rectifies that signal and converts it into a DC level. The DC level, being proportional to an amplitude of the utility grid voltage, is applied, via lead 77, to an analog input to Processing Circuit 500. The Processing Circuit periodically checks the value of that signal to ensure that the utility grid voltage remains within proper bounds.

Input Monitor 40, through amplifiers 42 and 44 (each including appropriate scaling and signal conditioning circuitry), produces analog voltages on leads 43 and 45, respectively, that reflect output current and voltage produced by the PV panel. Amplifier 42 determines the PV panel output current as a function of a voltage drop sensed, via leads 34 and 36, across current sensing resistor 20. An input to amplifier 44 is connected, via lead 32 and leads 5, to a positive output terminal of the PV panel to detect its output voltage. The sensed PV panel output current and voltage signals are applied to corresponding analog inputs of Processing Circuit 500.

Through various control signals communicated between Processing Circuit 500 and DC Converter 200, the former monitors and controls the operation of the latter. Specifically, Processing Circuit 500 produces, on lead 52, an analog Current Command which sets the amount of output current produced by DC Converter 200 that, in turn, is applied as input to Commutator 400. Processing Circuit 500, by implementing a so-called "Maximum Power Point Tracking" (MPPT) procedure (as described in detail below—and which consists of using two separate algorithms with selection between the two depending on the amount of power which the PV panel is then generating), attempts to operate the PV panel, at a point in its output characteristic (for a degree of illumination to which the panel is then exposed above a minimum usable level) that extracts maximum power from the panel and thus attains a high relative measure of efficiency. To provide a source of "clean power", the microinverter must limit any distortion it imparts to the utility grid to a maximum of approximately 5% third harmonic distortion (THD) throughout its entire output power band, i.e., from zero to maximum power. To effectuate this while avoiding system instabilities that might otherwise arise due to non-linearities existing in the Commutator, the Current Command is scaled, within DC Converter 200, by a two-bit Loop Gain Control value. This value, appearing on leads 58, is also produced by the Processing Circuit and depends on the magnitude of the Current Command, i.e., the requested output (drive) current level. For purposes of selecting the proper Loop Gain Control value, the range of output (drive) current is divided into four quartiles. The highest quartile carries the lowest value of Loop Gain Control; the lowest quartile carries the highest value, and so forth for the middle two quartiles.

Processing Circuit 500 also produces two separate enable signals: DC Converter Enable appearing on lead 54 to enable (turn on) or disable (turn off) the DC Converter, as required by the Processing Circuit, and Commutator Enable appearing on lead 62 to similarly enable or disable the Commutator as required.

DC Converter 200 produces, on lead 56, a Shadow Over-current (OC) Reset signal that indicates a shadow over-current condition. Such a condition arises whenever the solar radiation impinging on the PV panel is interrupted, such as when either a bird flies across the front of the PV panel or some other physical phenomena occurs that casts a shadow across the panel. When this happens, the output power produced of the PV panel will sharply and dramatically decrease, basically causing the output panel voltage to collapse. Shading of as little as approximately 5% of the PV panel surface area can cause its power output to decrease by as much as approximately 90%. In such instances, the power output capability of the panel may drop faster than the MPPT procedure can track it. Consequently, the control loop tries to maintain constant power to the grid, and the PWM pulse width soars, damaging the chopper in DC Converter 200. To prevent this situation from arising, the DC Converter monitors its output current and detects an over-current condition. When it occurs, depending on its magnitude, the DC Converter will be shut down, and, if the over-current is sufficiently large (i.e., a "hard" shutdown), a suitable level change will appear on Shadow Over-current Reset lead 56 to instruct Processing Circuit 500 to completely reset its operation and that of the entire microinverter. Alternatively, if the over-current is not large, i.e., a "soft" shutdown, then the DC Converter will still be shut down but, after expiration of a suitable time interval (determined by an RC time constant), will simply re-enable itself and re-commence its operation. In that instance, the output current from the DC Commutator (and Commutator 400) will be reduced to a minimum amount and, once the interval has expired, it will then be gradually increased to provide a desired amount of output power from the microinverter.

Commutator 400 detects zero crossings in the utility grid voltage and generates, via lead 64, a suitable signal to Processing Circuit 500. Using this signal, the Processing Circuit maintains tight synchronization between the period of its internal sine index which is used to generate, through DC Converter 200, the output waveform and the period of the utility grid voltage. As will be described in detail below particularly with respect to Overall Execution Threads 700 shown in FIG. 7, the occurrence of each such zero crossing triggers a corresponding interrupt service request within the Processing Circuit and the ensuing execution of an accompanying interrupt service routine to process that event.

Aux Power Supply 10, which is powered, via leads 5, by the PV panel, generates various DC supply voltages, on leads 17, required by the circuitry in the microinverter and also bias voltages required for the gate drive circuits used in commutator 400 (these circuits being described below in conjunction with FIG. 4). This supply also produces a status level, Aux Good, on lead 15, which reflects whether the auxiliary supply is properly operating and which is applied as an input status signal to Processing Circuit 500 (see FIG. 5, which will be discussed below).

Ground Fault Sense Circuit 80, being connected, via lead 87, to the negative terminal of the PV panel and, via lead 89, to chassis ground, conventionally detects current imbalances between the two input wires 5, and reflective of an external ground fault condition. A resulting output of circuit 80, i.e., GFDI (ground fault detection interruption) signal, is applied, via lead 85, to Processing Circuit 500.

2. DC Converter 200

Figure 2:
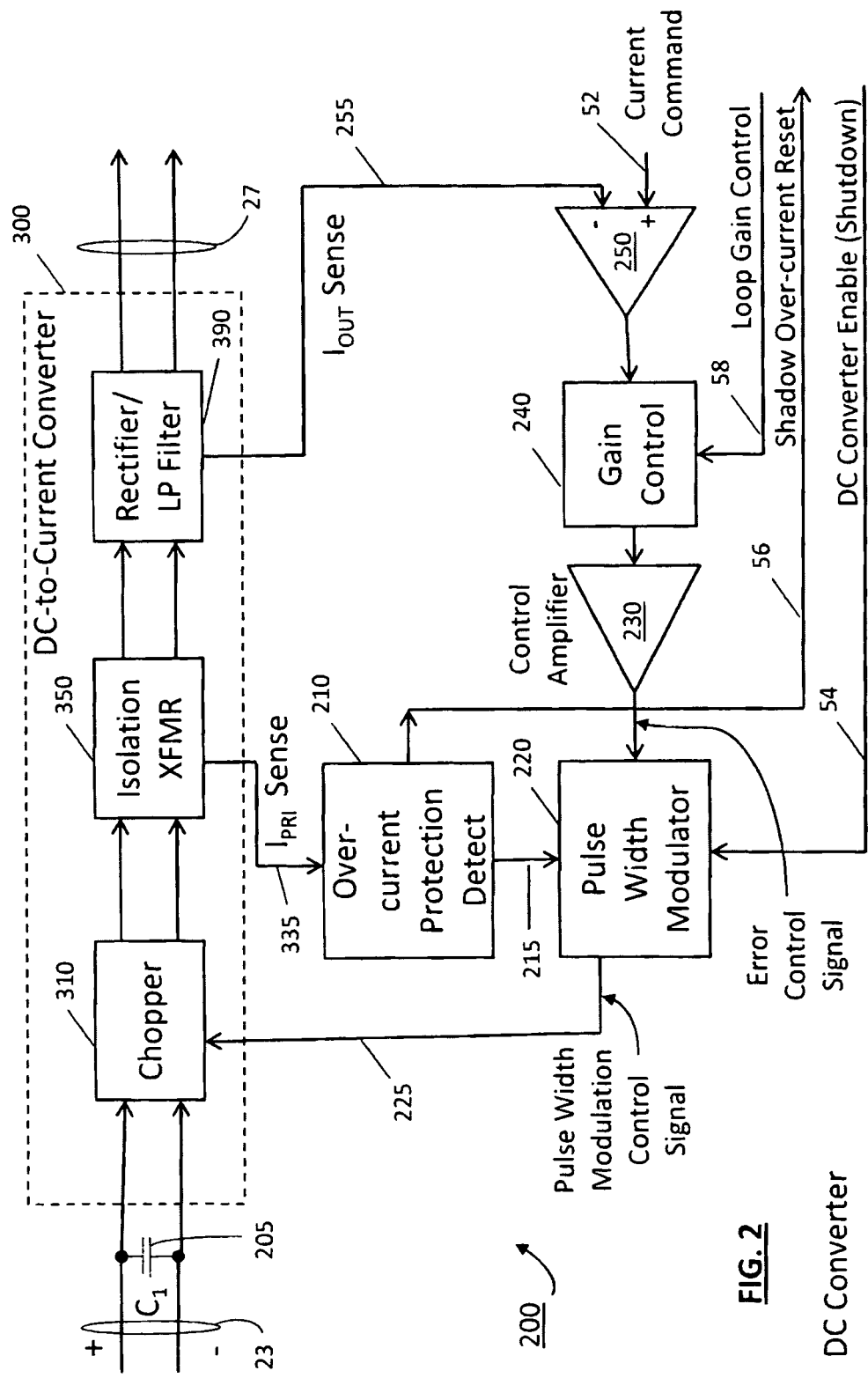
FIG. 2 depicts a block diagram of DC Converter 200 shown in FIG. 1.

FIG. 2 depicts a block diagram of DC Converter 200 shown in FIG. 1.

As shown, Converter 200 is formed of DC-to-Current Converter 300, Over-current Protection Detect circuit 210, Pulse Width Modulator 220, Control Amplifier 230, Gain Control 240 and Difference Amplifier 250. Capacitor 205, being suitably sized, stiffens the PV panel output voltage which is input to chopper 310, and prevents any high-frequency noise generated by the chopper itself from propagating back to the PV panel and being radiated, by the leads to the panel, as EMI.

DC-to-Current Converter 300, as noted above, converts the DC output power, appearing on leads 23, supplied by the PV panel into a full-wave rectified, unipolar current waveform. Converter 300 contains Chopper 310, Isolation Transformer 350 and Rectifier/Filter 390—all of which are shown in added detail in FIG. 3 and described in detail below in conjunction with that figure. In essence, Chopper 310, which is connected via lead 225 to Pulse Width Modulator 220, is controlled by that modulator to produce a fixed frequency output waveform, in the range of approximately 60-70 KHz, with a variable duty cycle, with the output of the modulated being referred to as a "pulse width modulation control signal". At any given instance, the duty cycle is tightly controlled, as will shortly be discussed, and reflects the amplitude of the output current then requested by Processing Circuit 500 (see FIG. 1) and produced by the microinverter for supply to the utility grid. Use of a pulse width modulated square wave permits the output current waveform generated by Chopper 310 to be serially passed through Isolation Transformer 350 in order to galvanically isolate the PV panel from the utility grid, thus preventing inadvertent ground loops and other adverse current paths from being established, during installation, between the PV panel and the utility grid. This advantageously imparts added safety to the entire installation. The output current appearing at the output of the isolation transformer is passed through Rectifier/Low Pass (LP) Filter 390 which converts the pulse-width modulated current waveform into a unipolar, full-wave rectified waveform, appearing on leads 27, having an amplitude governed by the pulse width modulation (PWM) duty cycle. The control loop drives the PWM duty cycle to drive a current into the grid. Consequently, the average value of voltage appearing across leads 27 is slightly higher than the average value of the grid voltage.

Through a feedback loop formed of Control Amplifier 230, Gain Control 240 and Difference Amplifier 250, Pulse Width Modulator 220 is controlled such that the current produced by Converter 300 precisely tracks the desired current then requested by Processing Circuit 500 and specified through the Current Command then appearing on lead 52. Specifically, Rectifier/LP Filter 390 produces a $I_{OUT}$ Sense signal, on lead 255, that measures an instantaneous amplitude of the output current then appearing on output leads 27. This amplitude is subtracted from the instantaneous value of the Current Command with a resulting error difference produced by amplifier 250 applied to Gain Control element 240. This element multiplies the error difference by a pre-defined loop gain value then associated with the 2-bit loop gain control value produced by Processing Circuit 500 and appearing on leads 58. As noted above, depending on which quartile the instantaneous output current amplitude falls relative to the maximum value of output current, the Loop Gain Control value will specify a corresponding one of four pre-defined loop gain values. The resulting signal is applied through Control Amplifier 230, which itself acts as a buffer and provides suitable frequency filtering and tailoring, as an input control signal (also referred to as an "error control signal") applied to Pulse Width Modulator 220 to vary the PWM duty cycle produced by Chopper 310. As a result of this feedback loop, the duty cycle varies such that the current waveform produced by Converter 300 precisely tracks the Current Command. Inasmuch as the Current Command is generated by Processing Circuit 500 as sinusoidally shaped (through a table lookup operation of a stored 256-point sine wave) and phase-locked to the grid voltage, the output current waveform produced by Converter 300 will remain in phase with and be synchronized to the utility grid voltage, with the amplitude of that waveform being the panel output current then requested by the Processing Circuit such that the panel operates at its maximum efficiency as determined by the MPPT procedure. Since the microinverter will operate at a power factor of substantially one, the current out of leads 27 will be in-phase with the grid voltage.

The operation of Pulse Width Modulator 220 is either enabled (turned on) or disabled (turned off) through an appropriate voltage level being supplied by Processing Circuit 500 to lead 54.

Over-current Protection Detect circuit 210 detects an over-current conduction, through monitoring, via lead 335, the current flowing into the primary ($I_{PRI}$ Sense) of Isolation Transformer 350, and produces a control signal, on lead 215, that shuts-down Pulse Width Modulator 220 and another control signal, for application via lead 56 to Processing Circuit 500, which serves as the Shadow Over-Current Reset signal. As noted, such an over-current condition can be caused by a shadow then being cast on the PV panel. Depending on the magnitude of the over-current, the shut-down will either be soft, or if that magnitude is sufficiently high, hard. As a self-protect feature, the primary current is monitored on a pulse-by-pulse basis (to implement so-called "pulse-by-pulse current detection").

For a soft shutdown, if $I_{PRI}$ exceeds a pre-determined threshold, Over-current Protection Detect circuit 210, via a suitable level change applied to lead 215, will temporarily disable Pulse Width Modulator 220 and, in turn, Chopper 310. Under this condition, being a soft shutdown condition, Detect circuit 210, after a suitable delay interval (set by a suitable RC time constant) expires, will then simply re-enable the modulator to re-commence its operation. Over-current Protection Detect circuit 210 contains a latch, with an RC (resistive-capacitive) circuit (all well-known and not shown), that implements an RC-based timer and produces the control signal on lead 215. Once the latch is set by an over-current condition, its output remains set until a time delay, defined by an associated RC time constant, expires. The time constant is chosen to be sufficiently long to ensure that no output current is generated and hence the Commutator FETs are kept off while a typical shadow occurs and for, as a safety margin, a suitable period of time thereafter. When set, the latch disables Pulse Width Modulator 220; when reset, the latch enables the modulator. The use of this delay interval provides continued protection against a series of recurring over-current conditions that might occur in relatively quick succession by disabling the Pulse Width Modulator during this entire interval and thus preventing any of four switching FETs used in Chopper 310 from being over-stressed and damaged. Once the pulse width modulator is re-enabled, Processing Circuit 500 linearly increases the microinverter output current to its appropriate level by ramping up the value of the Current Command applied, via lead 52, to DC Converter 200.

For a hard shutdown, Detect Circuit 210 will both shut-down the pulse width modulator, here too through the control signal applied to lead 215, and also suitably inform Processing Circuit 500 by applying a suitable level change to Shadow Over-Current Reset lead 56. This level change will cause the Processing Circuit to apply a level change to DC Converter Enable signal appearing on lead 54 to totally disable the Pulse Width Modulator. Once that occurs, the Processing Circuit will then completely reset the operation of the entire microinverter thus ensuring that the output current is gracefully re-established from a low level. By shutting down the pulse width modulator and nearly instantaneously reducing the output current to zero, circuit 220 protects the switching FETs in Commutator 400 (see FIG. 4) from experiencing sharp current spikes that might otherwise damage the FETs whenever a sudden shadow is cast on the PV panel.

3. DC-to-Current Converter 300

Figure 3:
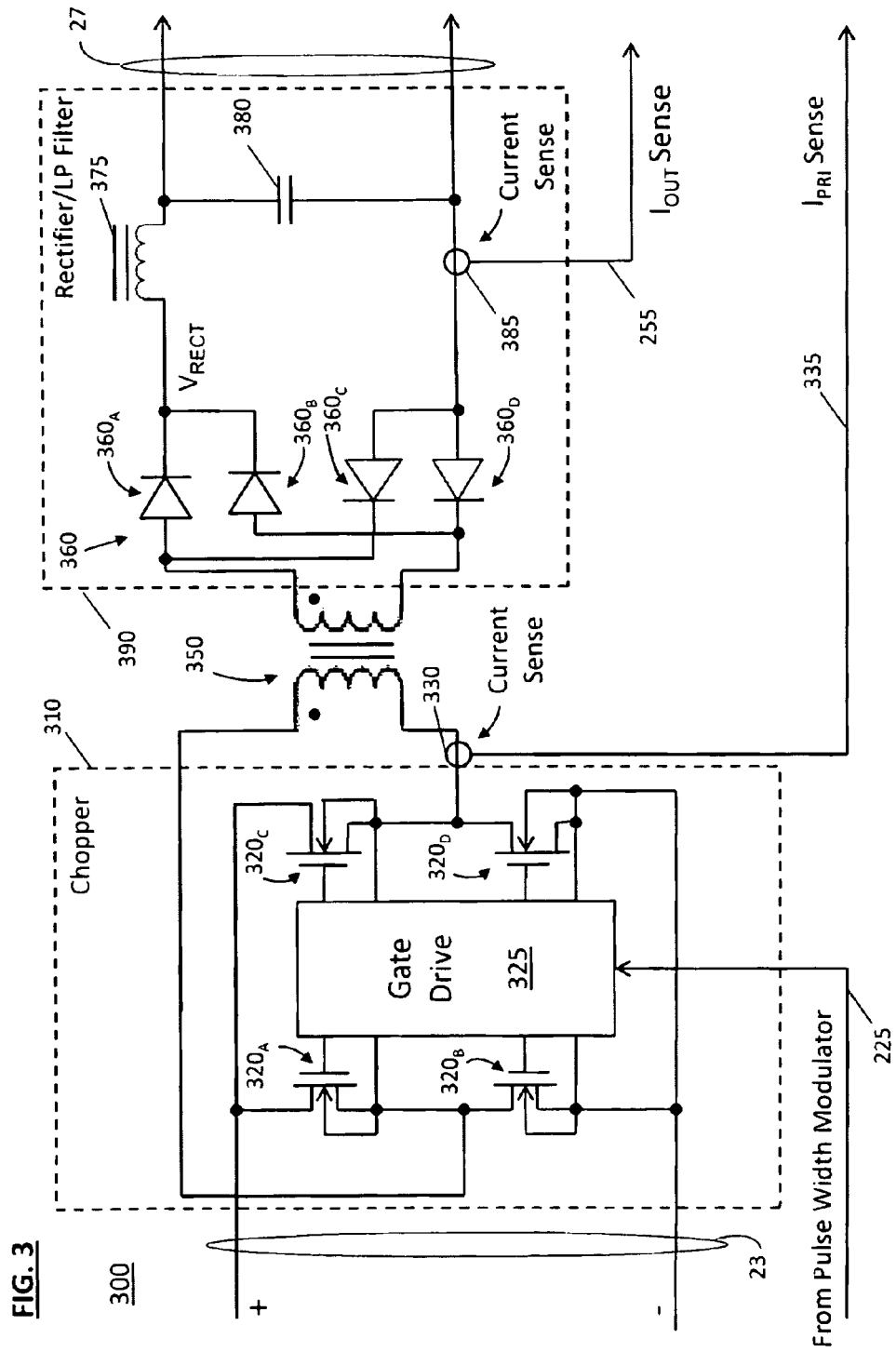
FIG. 3 depicts a block diagram of DC-to-Current Converter 300 which forms part of DC Converter 200 shown in FIG. 2.

FIG. 3 depicts a block diagram of DC voltage to Current Converter 300 which forms part of DC Converter 200 shown in FIG. 2. As noted, Converter 300 contains Chopper 310, Isolation Transformer 350 and Rectifier/LP Filter 390. This type of converter is frequently referred to as a "Buck" converter and is fundamentally a voltage-to-voltage converter. However with the addition of closed-loop current feedback, as shown in FIG. 2, this converter now functions as a voltage-to-current converter.

Chopper 310 consists of four switching FETs 320, specifically switching FETs $320_A$, $320_B$, $320_C$ and $320_D$, configured in a conventional H-Bridge, all driven through Gate Drive circuit 325. The Gate Drive circuit, which is also conventional, controls diagonally opposing pairs of the FETs to convert incoming DC current appearing on leads 23 into a chopped, bi-directional, pulse-width-modulated sinusoidal waveform. Drive circuit 325 switches FETs $320_A$ and $320_D$ on to route current flow, in a positive direction, through the primary winding of isolation transformer 350 to implement a positive half of the waveform while it maintains FETs $320_B$ and $320_C$ in a non-conductive (off) state. For the negative current flow during the next half cycle of current flow, FETs $320_B$ and $320_C$ are switched on, while FETs $320_A$ and $320_D$ remain non-conductive, and so forth for successive cycles. The pulse width modulation control signal then appearing on lead 225 from Pulse Width Modulator 220 (see FIG. 2) sets the instantaneous duty cycle for each pair of conductive FETs to generate the desired amount of output current.

Figure 6A:
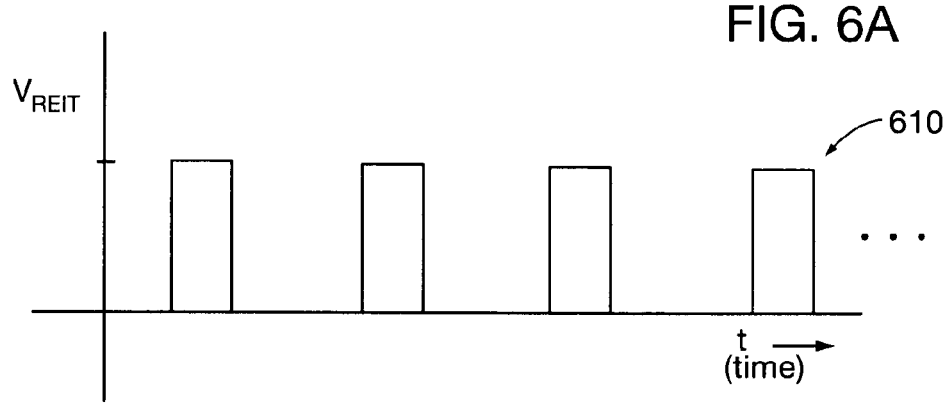
FIG. 6A depicts waveform 610 of voltage $V_{RECT}$ shown in FIG. 3.

The output current produced by Chopper 310 is routed through Isolation Transformer 350, with the amount of primary current ($I_{PRI}$ Sense) being measured by Current Sense (detector) 330 with its measured analog result appearing on lead 335. The square-wave output, having both positive and negative pulse-width modulated half cycles occurring at the chopper switching frequency and appearing at the secondary of the transformer is applied through full-wave rectifier 360, formed of diodes $360_A$, $360_B$, $360_C$ and $360_D$, to yield a unipolar pulse width modulated voltage waveform ($V_{RECT}$), shown in FIG. 6A by waveform 610, which, for simplicity of illustration, is depicted at an exemplary constant duty cycle. This unipolar pulse width modulated waveform is then passed through a low pass filter formed of inductor 375 and capacitor 380 (see FIG. 3) which, through filtering out high frequency components, yields, on leads 27, a full-wave rectified waveform of positive half-cycles having an amplitude proportional to the pulse-width modulated duty cycle. The output current applied to leads 27 is detected by Current Sense (detector) 385 with its analog output ($I_{OUT}$ Sense) applied to lead 255.

Frequently, the utility grid voltage contains transients that result from various sources, such as large machinery situated on the grid that draws high in-rush currents or lightning strikes that induce current into utility transmission lines. Using pulse-by-pulse current detection, as described above advantageously prevents any damage from occurring to the FETs in Chopper 310.

As an example, assume that the microinverter is operating at a crest of the sine wave of the grid voltage. At this point in time, Pulse Width Modulator 220 (see FIG. 2) is driving Chopper 310 with a high duty cycle waveform in order to accommodate a high peak output voltage and current. Now assume that a negative going line transient occurs on the utility grid that was sufficient to then reduce the utility grid voltage to zero. This drives the voltage then appearing across leads 27 (see FIGS. 1 and 3) to zero, thus causing an effective short circuit across those leads. Abnormally high currents occur which would be reflected back through the primary of transformer 350 to Chopper 310 and particularly to FETs $320_A$, $320_B$, $320_C$ and $320_D$. Ordinarily, the $I_{OUT}$ Sense signal appearing on lead 255 (See FIG. 3) reflects the output current and, through application to the current feedback loop specifically to an input of Difference Amplifier 250, causes Pulse Width Modulator 220 to suitably adjust the PWM duty cycle to maintain desired output current level. However, this control loop has limited bandwidth. Thus, a finite number of inverter cycles will occur before the control loop can react to and reduce the output current to a safe level. Under this scenario, FETs $320_A$, $320_B$, $320_C$ and $320_D$ could be severely stressed from conducting multiple abnormally high current pulses. However, through pulse-by-pulse current monitoring—as described above, such damage is advantageously prevented. Specifically, in such a scenario, the first abnormally high current pulse will cause Over-current Protection Detect circuit 210 to shut down Pulse Width Modulator 220 and Chopper 310, thus preventing any of these FETs from being switched on. Depending on the magnitude of the over-current, this shut-down may be a "soft shutdown" and thus be temporary with Pulse Width Modulator restarting after expiration of a suitable RC time constant, or a "hard shutdown" which necessitates that the microinverter is reset and completely restarted.

4. Commutator 400

FIG. 4 depicts a block diagram of Commutator 400 shown in FIG. 1.

The Commutator is comprised of four switching FETs $420_A$, $420_B$, $420_C$ and $420_D$ (henceforth collectively referred to as "Commutator FETs" to readily distinguish them from the FETs used in Chopper 310) organized in an H-bridge configuration, each connecting, via its source and gate terminals, to its corresponding gate drive circuit $430_A$, $430_B$, $430_C$ and $430_D$, respectively. All the gate drive circuits are controlled, via leads 455, by Switch Control 450. The gate drive circuits are powered, via leads 440, by Isolated Gate Bias voltages, produced through Aux (Auxiliary) Power Supply 10 (see FIG. 1). As shown in FIG. 4, Gate Drive circuits $430_A$ and 430$_D$ control peered FETs 420$_A$ and 420$_D$ and receive their gate bias voltage through leads 440$_A$ and 440$_B$, respectively; circuits 430$_B$ and 430$_C$ control peered FETs 420$_B$ and 420$_C$ and receive their gate bias voltage through leads 440$_B$ and 440$_C$, respectively.

Figure 6C:
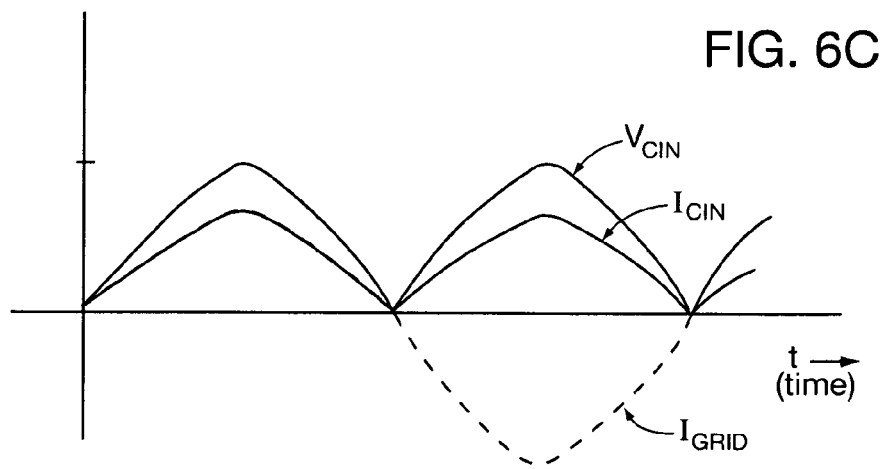
FIG. 6C depicts input voltage and current, $V_{Cin}$ and $I_{Cin}$, respectively, appearing at the input of Commutator 400 and output current, $I_{GRID}$, appearing at the output of the commutator, all as shown in FIG. 4.

Incoming full-wave sinusoidal current generated by DC Converter 200 is serially applied, via leads 27, to the Commutator which converts it into a resulting AC sinusoidal output current, synchronized with zero-crossings in the grid voltage, and applies that output current to leads 90. Waveforms of the Commutator input voltage ($V_{Cin}$) and input current ($I_{Cin}$) are shown in FIG. 6C along with in dashed lines the sinusoidal output current ($I_{GRID}$) generated by the commutator and applied to the utility grid. Returning to FIG. 4, this unipolar full-wave to bipolar AC current conversion is accomplished by operating each of two pairs of diagonally-situated switching FETs in the bridge in a staggered fashion, with one pair being conductive (on) for essentially the entire duration of a half-cycle while the other pair remains non-conductive (off); with the operation reversing during the next half-cycle, and so forth. The Commutator FETs are switched into their conductive and non-conductive states synchronized to but very slightly offset, in time, from the occurrence of each zero-crossing in the grid voltage.

Figure 6B:
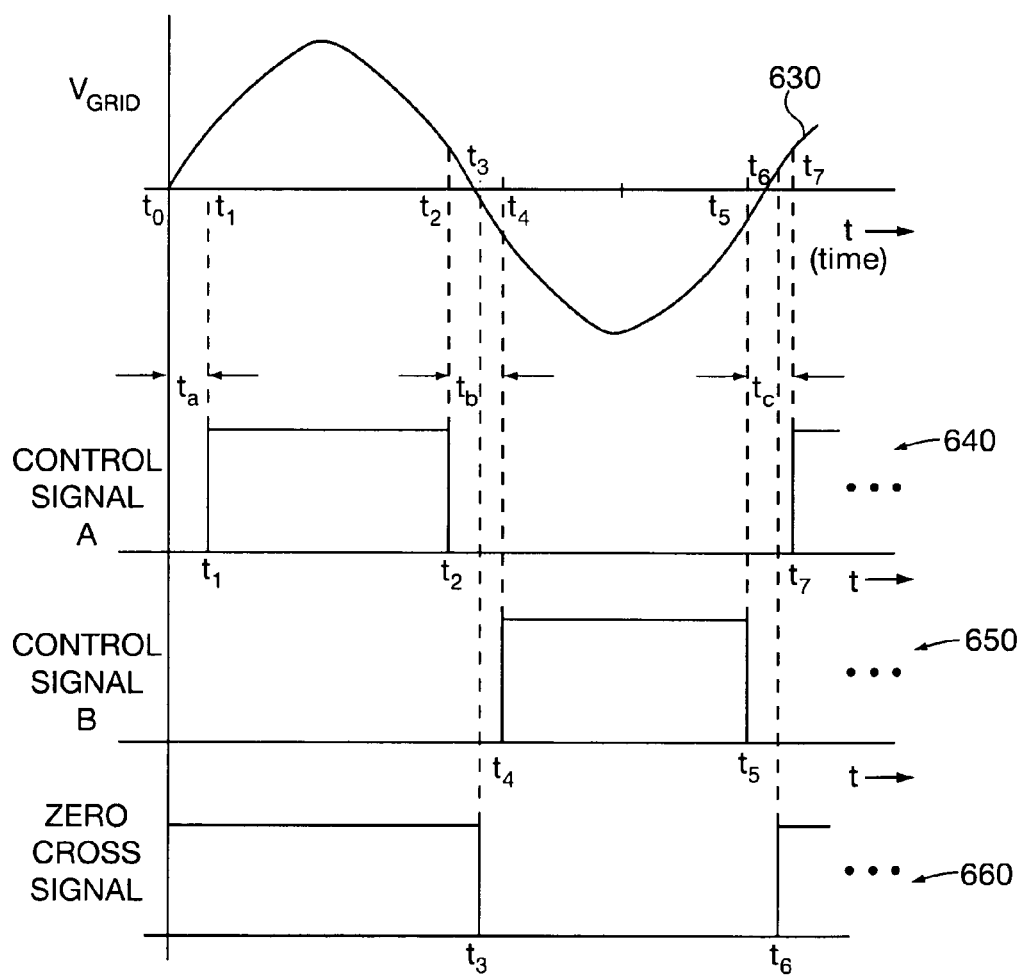
FIG. 6B depicts waveforms of monitored grid voltage, $V_{GRID}$, and Control Signals A and B, all shown in FIG. 4.

The present inventors have recognized that the Commutator FETs could be at risk of being damaged if timing of a detected zero crossing is slightly skewed with respect to that of an actual zero crossing in the grid voltage. Such skew can occur for a variety of reasons, including offset voltages associated with the circuitry of Grid Voltage Monitor 70 (see FIG. 1). Should this occur, a pair of the Commutator FETs, that were previously conductive (during the prior half-cycle), may be remain on and switched into their off states later than the actual zero crossing, i.e., while the utility grid voltage is non-zero. As such, a current spike would flow through these FETs which, if sufficiently large, could damage them. This instance would more likely arise where the utility grid presents a relatively high impedance to the microinverter. Nevertheless, to advantageously prevent such spikes from occurring in any such instance and regardless of the grid impedance, Zero Cross Detect circuit 460 incorporates a relatively small, but suitable limited dead-band voltage interval centered about a measured zero-crossing to implement a so-called "limited differential dead band". This so-called "dead band interval" is shown, though exaggerated for purposes of illustration, in FIG. 6B, as exemplary time intervals $t_b$ and $t_c$, with interval $t_a$ (also a dead band interval) here being half the width of the other two intervals solely by virtue of voltage $V_{GRID}$ being illustrated as starting at time $t_0$.

Specifically, circuit 460 (see FIG. 4) contains Grid voltage Windowing Comparator 465 that has two comparators which collectively establish a window bordered by relatively small nominal upper and lower thresholds centered about an offset value of the monitored grid voltage ($V_{GRID}$) (the offset being predefined and used to shift a measured zero value in the grid voltage, i.e., without any DC component, to a suitable value well within the working range of unipolar powered operational amplifiers used for the comparators). The thresholds are set to be larger than worst-case offset voltages that will occur in both Grid Monitor 70 and associated circuitry that subsequently handles the monitored grid voltage signal. Control signals A and B, generated by Detector 460 indicates whether the difference between the offset monitored grid voltage and the offset is greater or less than the threshold. To prevent damage to any of the Commutator FETs from current spikes that might otherwise arise, the appropriate pair of Commutator FETs is turned on only when the threshold is exceeded (i.e., the monitored grid voltage has increased either in a positive or negative direction relative to the corresponding threshold values). Use of the thresholds effectively causes Control Signals A and B (which are shown as corresponding waveforms 640 and 650 in FIG. 6B) to transition at voltages that are slightly greater, both positively and negatively, than at zero crossing points on the monitored grid voltage. In contrast, the Zero Cross Signal (which is illustrated by waveform 660 shown in FIG. 6B) appearing on lead 64 and applied to Processing Circuit 500 changes level essentially coincident with the actual zero crossing points in the monitored grid voltage. During each dead band interval, all the Commutator FETs remain off.

Figure 4A:
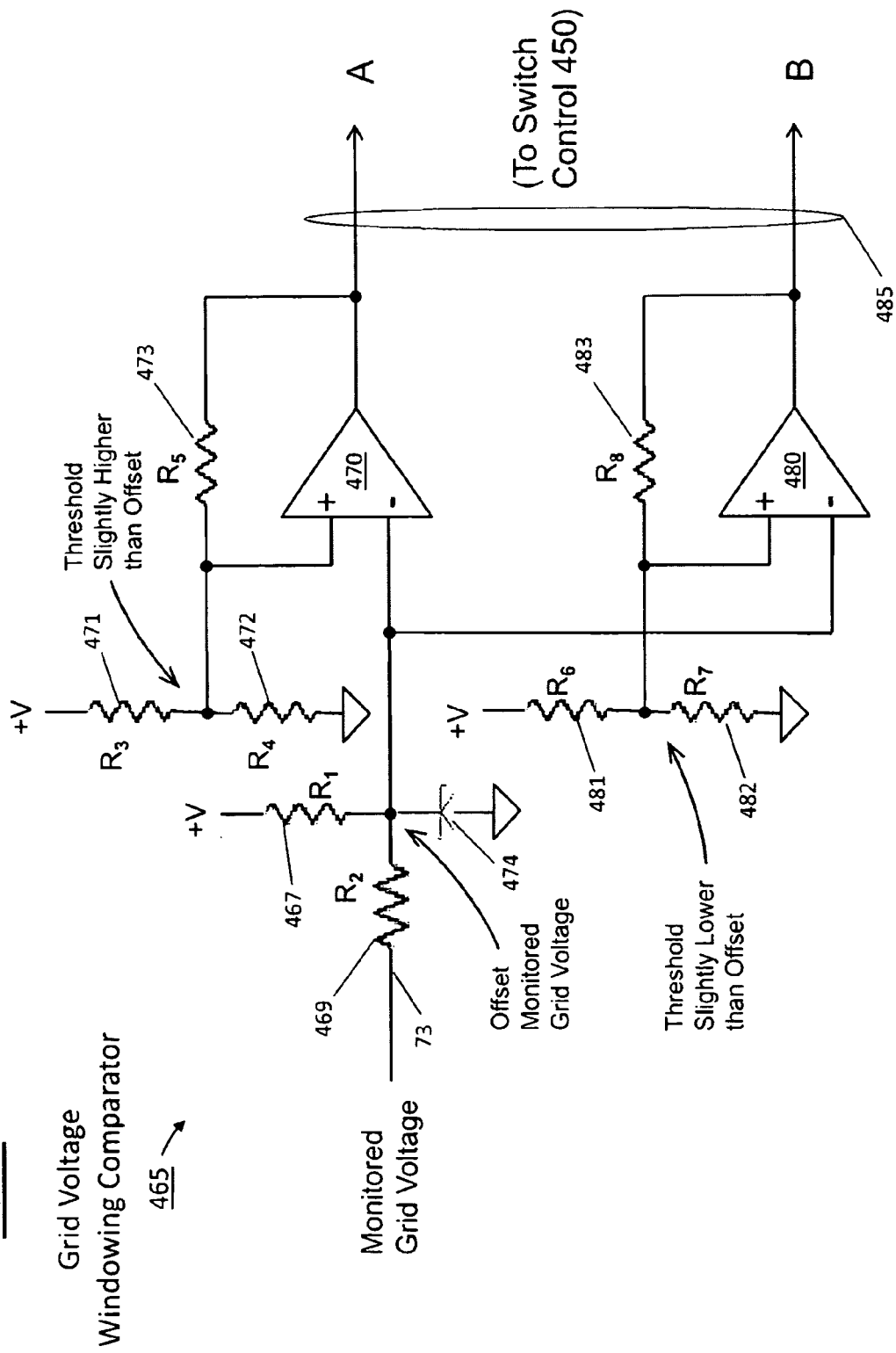
FIG. 4A depicts a simplified schematic of Grid Voltage Windowing Comparator 465 shown in FIG. 4.

Diverting slightly, Grid Voltage Windowing Comparator 465 is shown in simplified schematic form in FIG. 4A.

As shown, the monitored grid voltage ($V_{GRID}$), appearing on input lead 73 is offset, by a fixed amount relative to a positive power supply value (+V), from a zero average value, to a value determined by a resistive input divider formed of resistors 467 and 469 (also labeled $R_1$ and $R_2$), and clamped to a maximum value set by Zener diode 474. The values of resistors $R_1$ and $R_2$ determine the offset. The resulting offset grid voltage is applied to a negative input of comparators 470 and 480 which respectively determine a difference between that offset voltage and fixed thresholds set slightly higher and lower than the fixed amount of the offset. The values of resistors 471 ($R_3$), 472 ($R_4$), and 481 ($R_6$) and 482 ($R_7$) connected to form corresponding voltage dividers determine the upper and lower threshold values accordingly. Feedback resistors 473 ($R_5$) and 483 ($R_6$) in combination with resistors $R_4$ and $R_7$ determine the gain provided by comparators 470 and 480. The resulting signals produced by comparators 470 and 480, on leads 485, are Control signals A and B, respectively.

Now returning to FIG. 4. Specifically, after the start of each positive half-cycle of grid voltage and at a time when the offset monitored grid voltage has reached the upper threshold value (though modified slightly by a hysteresis voltage as described below), the Commutator switches on FETs 420$_A$ and 420$_D$ to implement positive output current flow. These two FETs remain in these states until a point in time is reached slightly before the next zero-crossing, when the grid voltage has decreased to the upper threshold value (again modified by the hysteresis voltage) near the end of that half-cycle, and are then switched off. During this entire half-cycle, the other two FETs 420$_B$ and 420$_C$ remain off. Slightly after the start of the succeeding negative half-cycle of grid voltage and when the grid voltage has increased negatively to the lower threshold value (again modified slightly by a hysteresis voltage), the latter two FETs are switched on to implement negative current flow and stay on until the grid voltage negatively decreases to the lower threshold (here too modified by a hysteresis voltage). Meanwhile, the former two FETs remain off during this entire half-cycle. These operations simply repeat on the ensuing half-cycles.

Control signals A and B are applied to Switch Control 450 which, through leads 455, provides suitable voltage levels to the individual gate drive circuits to suitably place a diagonally situated pair of the FETs into either a conductive or non-conductive state at the appropriate time.

Zero Cross Detect circuit 460 also generates a Zero Cross control signal, on lead 64, to indicate the occurrence of each such zero-crossing for use by Processing Circuit 500. As will be discussed in detail below, each such occurrence triggers an interrupt service routine such that the Processing Circuit can appropriately process that occurrence. Switch Control 450 is either enabled or disabled whenever a suitable level is applied, by Processing Circuit 500, as the Commutator Enable signal on lead 62.

The state of the Commutator FETs is well defined by the circuitry as long as the auxiliary supply voltages remain within acceptable limits. Upon removal of PV panel output power, which occurs at least once a day, and as the auxiliary supply voltages decay through a region between "acceptable" and zero, system logic within the microinverter can become corrupted. In practice, the utility grid voltage will always be present. Consequently, if corrupted signals cause a Commutator FET to inadvertently turn on when the PV is not producing output power, a short circuit scenario, similar to that described above in the case of timing skew, could possibly occur. In this scenario, the duration of any short circuit could be much longer than that caused by a timing skew and hence can result in damage to that FET. To prevent this abnormal condition from occurring, the isolated gate basis voltages on leads 440 from Auxiliary Power Supply 10 (see FIG. 1) that supply, via leads $440_A$, $440_B$ and $440_C$, gate driver circuits $430_A$, $430_B$, $430_C$ and $430_D$ (shown in FIG. 4) are immediately switched off, by the Auxiliary Power Supply, whenever that supply detects that its output voltages have fallen below a pre-set but still "safe" value. By completely removing the supply voltage to all the drive circuits, those circuits then become simply incapable of turning on any Commutator FET, regardless of any potentially corrupted signals.

To prevent errant Commutator operation that might otherwise occur and thus provide added stability and noise immunity and prevent "signal chatter", Detector 460 also imparts (through circuitry that is well-known, but not shown) a sufficient measure of hysteresis centered about the upper and lower threshold values for use in comparing the offset monitored grid voltage against the upper and lower threshold values. As such, for the positive half-cycle of the monitored grid voltage, that voltage must reach the sum of the upper threshold value together with its hysteresis value before Commutator FETs $420_A$ and $420_D$ are switched on. Similarly, the monitored grid voltage must decrease positively to the upper threshold voltage less the hysteresis voltage before those same Commutator FETs are switched off. Hysteresis is similarly added to the lower threshold voltage for use with the negative half-cycle in the monitored grid voltage.

Advantageously and in accordance with our inventive teachings, the Commutator FETs are not appreciably operated, if at all, in their linear modes and are switched very close to zero-crossings in the grid voltage. As such, their switching loss is essentially just their $I^2R$ heating loss associated with their resistance in their fully conductive (on) state. As that resistance is quite low, these FETs, when operating at their full intended output current of approximately 4 Amps for a 470 watt output from the microinverter, dissipate relatively little power and remain cool to the touch, thus providing highly efficient operation.

Further, given the inductance in the windings of the isolation transformer (hence presenting an increasing impedance at frequencies increasingly greater than the power line frequency), any relatively high-frequency transients that may appear on the grid voltage are substantially, if not completely, blocked (filtered out) by this impedance from propagating back through the isolation transformer to chopper 310 and adversely affecting its operation. Additionally, since the Commutators FETs are then either basically completely conductive or completely off, any such transients will merely pass through those conductive FETs without adversely affecting them and have substantially no affect, if any, whatsoever on the non-conducting FETs.

Prior art microinverter designs tended to incorporate, either within or connected to their chopper stage, high capacitance electrolytic capacitors (often with as much as, e.g., 28,000 uF of capacitance). In those designs, transient-induced current spikes on the utility grid tended to propagate back into the microinverter and, where sufficiently large and coupled with the high-frequency operation of the chopper stage, caused stresses to appear in those capacitors. These stresses, caused the capacitors to pre-maturely fail. This, in turn, markedly reduced overall system reliability. In contrast, the inventive design, through inclusion of an isolation transformer at the output of Chopper 310, provides sufficient isolation to prevent high-frequency transient current from flowing back through its secondary winding. In addition, the inventive design employing a high bandwidth control loop on the DC Converter 200 and employing commutation 400 in the output path eliminates the need for a 2nd chopper stage with its switching losses and large electrolytic capacitors. Consequently, the inventive design advantageously exhibits significantly increased overall system reliability over that of conventional designs.

The inventive microinverter is primarily controlled by the current produced by the PV panel and not by the grid voltage. As such, the output of the microinverter, which is essentially a pure sinusoidal current signal, will not substantially, if at all, follow any abnormalities then appearing in the grid voltage, whether glitches, transients or the like. Thus, by generating an essentially pure sinusoidal output, the microinverter will effectively "clean up" the grid. As additional microinverters are connected in parallel, via a common connection, to the utility grid to supply increased output current, this will beneficially reduce distortion or other abnormalities, then appearing on that utility grid connection, even further.

5. Processing Circuit 500

Figure 5:
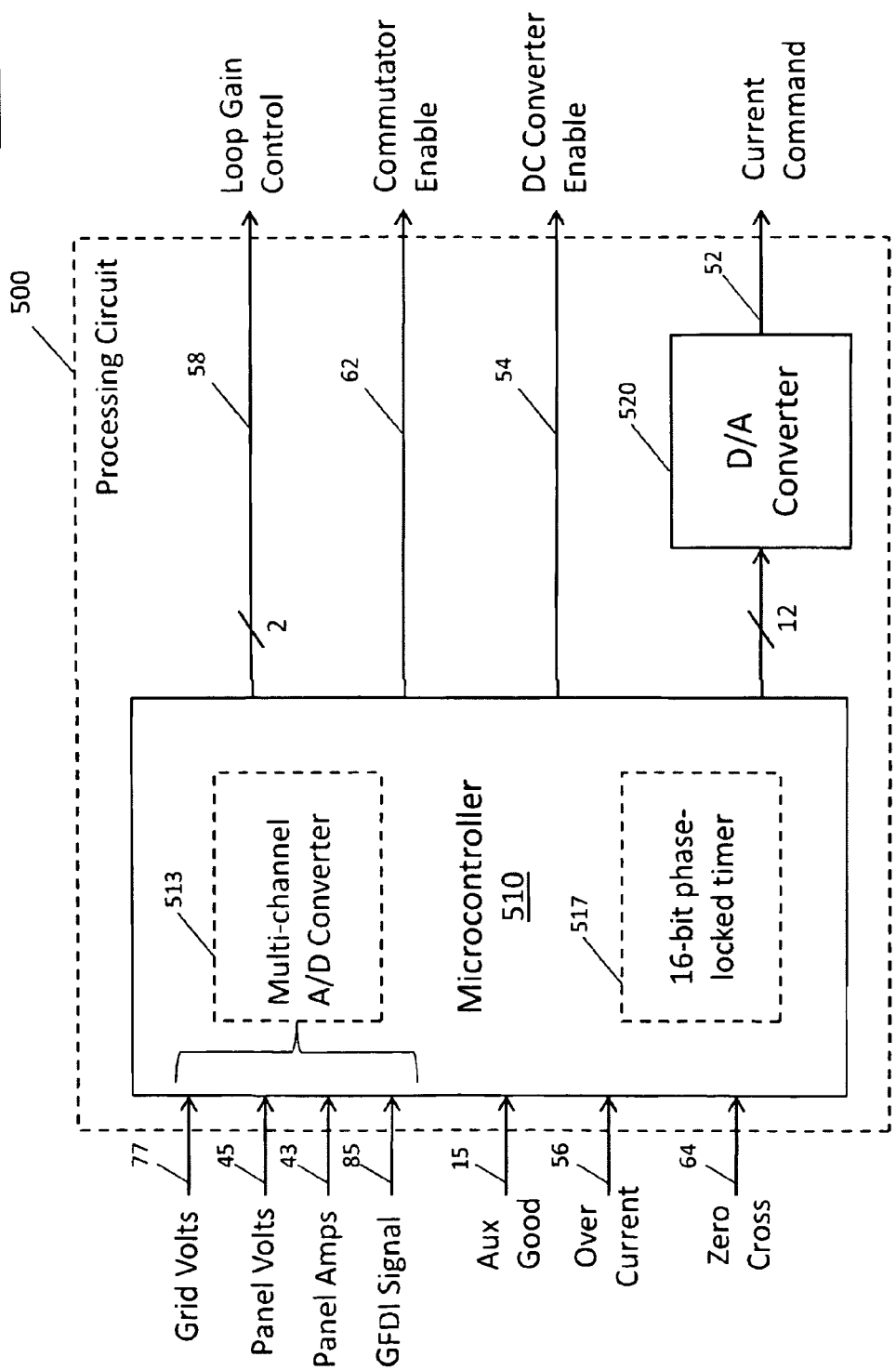
FIG. 5 depicts a block diagram of Processing Circuit 500 shown in FIG. 1.

FIG. 5 depicts a block diagram of Processing Circuit 500 shown in FIG. 1.

Processing circuit 500 contains Microcontroller 510 and 12-bit digital-to-analog (D/A) converter 520. Through internal multi-channel analog-to-digital (A/D) converter 513, various analog voltages are provided as input to the microcontroller, specifically utility grid voltage (Grid Volts) on lead 77; output voltage produced by the PV Panel (Panel Volts) on lead 45; output current produced by the PV Panel (Panel Amps) on lead 43; and the ground fault detection interruption (GFDI) signal (being indicative of a ground fault condition) on lead 85. Each of these signals is selected under software control, as discussed in detail below, and then converted into digital form by converter 513 for subsequent processing by the microcontroller. The following signals are provided in digital form as additional inputs to the microcontroller: Aux Good signal (reflective of the status of the auxiliary power supply—see FIG. 1) on lead 15; a reset signal (Over Current) on lead 56 (see FIG. 5) caused by a shadow induced overcurrent condition; and a control signal (Zero Cross) on lead 64 and reflecting each zero crossing in the utility grid voltage. The value of each of these signals is likewise processed by the microcontroller. The microcontroller itself operates at a clock frequency of 50 MHz with that frequency being derived by multiplying, by a factor of eight and through a phase-locked loop (not shown), an output clock signal of a 6.25 MHz crystal-based oscillator.

Microcontroller 510 produces, as output, a two-bit loop gain control signal on lead 58, and single-bit Commutator and DC Converter Enable signals on leads 62 and 54, respectively. Further, the microcontroller produces a 12-bit digital signal which is applied to D/A Converter 520 for conversion into a Current Command signal which is applied to lead 52.

The microcontroller also contains 16-bit Phase-locked Timer 517. This timer is used to synchronize the generation of a sine wave, through a table look-up operation conducted by the microcontroller—as described in detail below, to zero-crossings in the utility grid voltage such that the sinusoidal Current Command signal appearing on lead 52, which is based on that sine wave, remains synchronized to and in-phase with the utility grid voltage (and the utility grid current). Since the output current of the microinverter remains substantially, if not totally, in-phase with the grid voltage, the microinverter advantageously produces an output to the power grid at approximately, if not equal to, a unity power factor.

B. Software

1. Overall Block Diagram

FIG. 7 depicts a flowchart of Overall Execution Threads 700 executed by Microcontroller 510 shown in FIG. 5.

As shown, the software consists of four basic blocks and specific execution threads amongst them. These blocks consist of an initialization block, a main loop and two interrupt service routines (ISRs).

Upon a power on reset or fault reset condition, when execution is re-started, execution first enters block 710 to perform Initialization and Initial Checks Routine 800. This routine initializes various variables, reads values of various stored parameters; measures and checks, on an initial basis, whether various operating parameters are within proper bounds, establishes various operating conditions (such as synchronizing an index into an internal sine table to actual zero crossings in the grid voltage, and enabling both DC Converter 200 and Commutator 400).

During normal operation, once execution of block 710 has completed, execution then proceeds, via path 713, to block 740 which executes Main Loop Routine 1100. Absent the occurrence of an interrupt or a fault condition, execution will remain within routine 1100 which provides the main control over the microinverter including ensuring the PV panel is operating efficiently (at its maximum power point tracking—MPPT—point) and performing various real-time operating parameter checks.

While execution occurs within block 740, i.e., during execution of main loop 1100, two interrupts occur: a sine index interrupt and a zero crossing interrupt.

A sinusoidal waveform is stored within the microcontroller and is divided into 128 successive increments on each half-wave (for a total of 256 increments over one complete cycle). The sine wave interrupt, which is triggered by Phase-locked Timer 517 (see FIG. 5) situated within Microcontroller 510, causes Main Loop 1100 to suspend its execution and jump, via path 723, to block 720 through which Sine Index Interrupt Service Routine (ISR) 1600, is itself executed. This ISR primarily increments a counter (sine index) to point to a next successive value in the sine table and then reads that value out for subsequent use by Main Loop 1100 in calculating the requested output current. Once this ISR completes its execution, then execution returns, via path 727, to block 740 which, in turn, resumes execution of routine 1100. If a fault condition occurs during execution of Sine Index ISR 1600, execution is transferred, via path 725, back to block 710 to re-start and re-initialize the microinverter by re-invoking routine 800.

Alternatively, should a zero crossing in the grid voltage be detected while Main Loop 1110 is executing, this will generate an interrupt that, as its effect, suspends execution of the Main Loop and causes execution to transfer, via path 737, to block 730 through which Zero Crossing ISR 1400 is executed. Routine 1400 primarily measures the period between the present and immediately prior zero crossings and adjusts the phase locking of Timer 517 as necessary to maintain synchronism between the timer operation and the zero crossings, performs MPPT calculations to determine whether the PV panel is still operating at its peak power point and adjust the panel operating point if need be, and adjusts the loop gain control value by an appropriate 2-bit value, applied to lead 58 (see FIGS. 1 and 2), based on the level of the output current level then being requested from the microinverter. Once this ISR completes its execution, then execution returns, via path 733, to block 740 which, in turn, resumes execution of routine 1100. If a fault condition occurs during execution of Zero Crossing ISR 1400, execution is transferred, via path 735, back to block 710 to re-start and re-initialize the microinverter by re-invoking routine 800. For simplicity, the detection and processing of fault conditions are omitted from both routines 1400 (FIG. 14) and 1600 (FIG. 16) as they would be readily apparent to anyone of skill in the art from the discussion provided herein, and as such will not be discussed any further.

2. Initialization and Initial Checks Routine 800

Figure 8A:
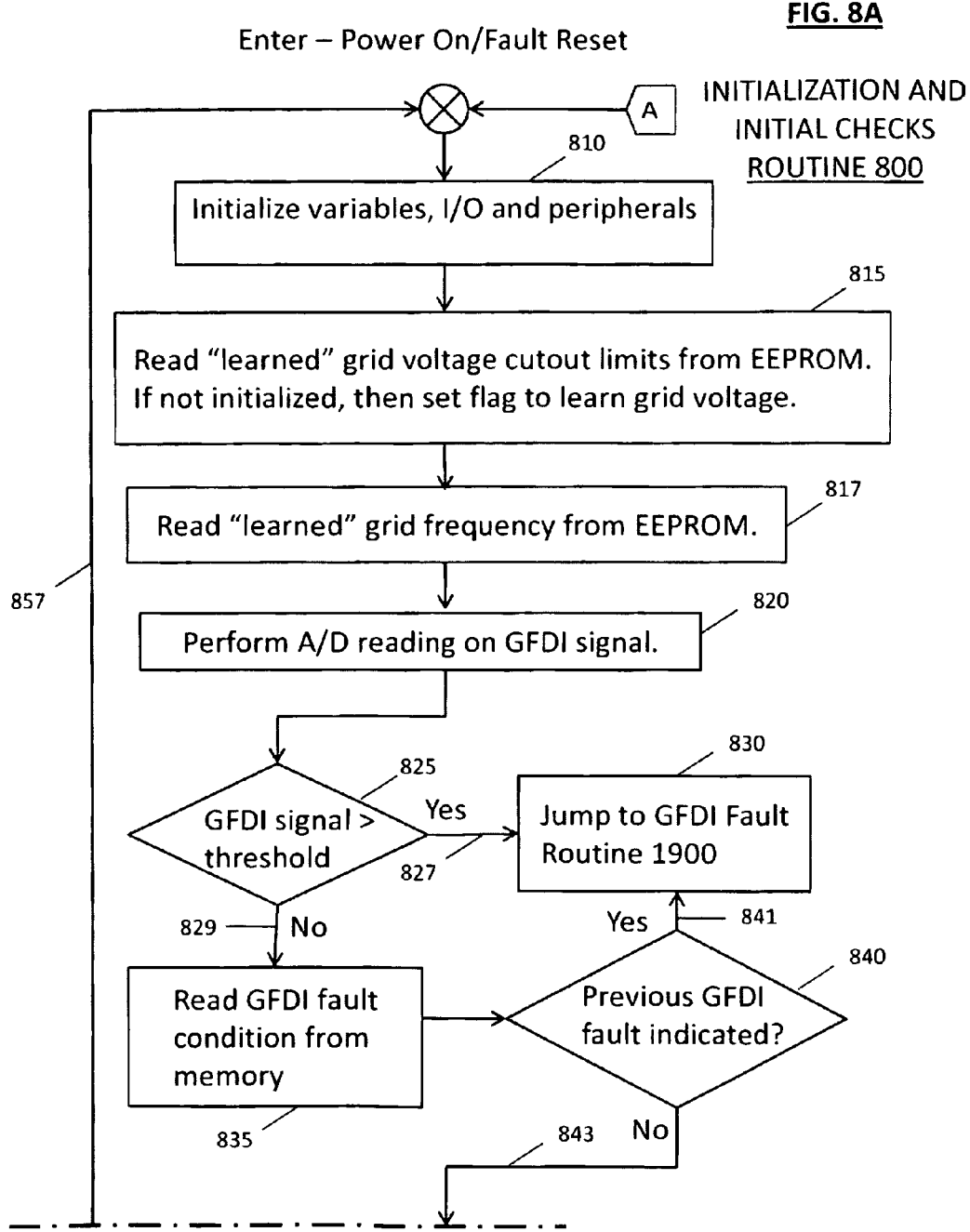

FIGS. 8A-8B collectively depict a flowchart of Initialization and Initial Checks Routine 800 which is executed within Overall Execution Threads 700 shown in FIG. 7; FIG. 8 depicts the correct alignment of the drawing sheets for FIGS. 8A-8B. As noted, this routine initializes various variables, reads values of various stored parameters; measures and checks, on an initial basis, whether various operating parameters are within proper bounds, and establishes various operating conditions.

Upon entry into this routine, which occurs through a system reset caused by either a fault or a power-on (which is the same condition for initial entry into block 710, though each is separately shown with the same entry point for simplicity and ease of understanding and illustration), execution starts with block 810. This block, when performed, initializes various variables, input/output circuitry and peripherals connected to or associated with the microcontroller. These peripherals include Phase-locked Timer 517 (see FIG. 5), and well-known communication interfaces (not shown) including that used to write data to D/A Converter 520. Thereafter and as shown in FIG. 8A, execution passes to block 815 which reads a limit on expected grid voltage from memory associated with the microcontroller. This limit is based on the expected standard utility voltage in a particular region in which the microinverter is to be used. This region and its corresponding limit are established and set during manufacture of the microinverter. Specifically, if this limit is not yet stored, then the first time the unit is powered-on during its manufacture, the expected utility voltage at its intended frequency is applied to the microinverter which measures both. These voltage/frequency pairs include, e.g., 208 volts (for 3-phase use) or 240 volts (for single phase use) both at 60 Hz for the US, and 230 volts at 50 Hz for Europe. Once these values are measured, they are stored within the unit as "learned" parameters for subsequent use and a limit is associated with the voltage. Any unit to which a 50 or 60 Hz voltage has been applied is assumed to be destined for use in Europe or the US, respectively. Regulatory bodies in different regions of the world (US and Europe in this instance) which exercise oversight responsibility over electrical utility grids in those regions often specify different rules (e.g., sufficiently high over-voltages that occur for specified time periods) to indicate a fault condition which requires that the microinverter shut itself off. For example, a +10% over-voltage condition lasting for 5 minutes in length will necessitate a shutdown in the US; while a 15% over-condition lasting for 30 seconds will necessitate a shutdown in Europe. Once block 815 completes its execution, execution proceeds to block 817. This particular block reads the "learned" utility grid frequency from memory.

Thereafter, execution proceeds to block 820 to measure the GFDI (ground fault detection interruption) signal as provided by Ground Fault Sense Circuit 80 (see FIG. 1). As discussed previously, circuit 80 determines whether a ground fault exists, i.e., an excess current imbalance then exists between the ground connection of the PV panel and earth ground itself. Decision block 825 then determines whether the GFDI signal exceeds a predefined threshold indicative of a ground fault. This threshold, though not critical, is typically set close to zero. If this threshold is exceeded, then decision block 825 routes execution, via YES path 827, to block 830. Block 830, when executed, simply causes execution to unconditionally jump to GFDI Fault Routine 1900.

3. GFDI Fault Routine 1900

Figure 19:
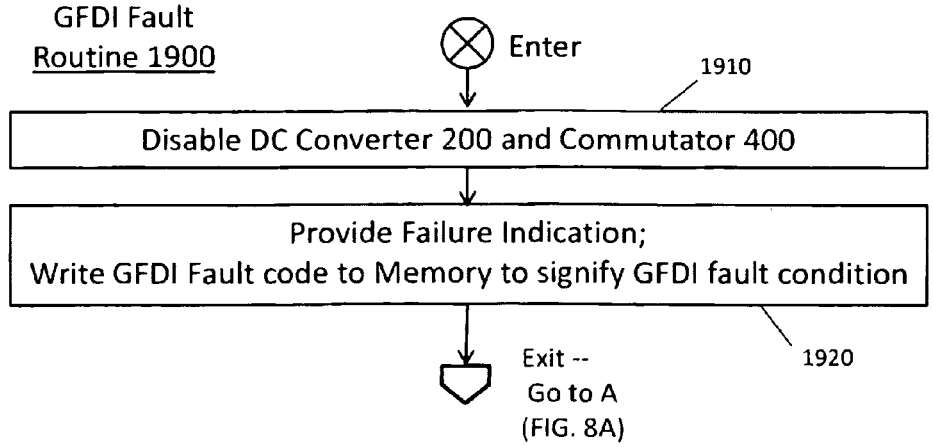
FIG. 19 depicts a flowchart of GFDI Fault Routine 1900 that can be reached from either Initialization and Initial Checks Routine 800 (shown in FIGS. 8A-8B) or Main Loop 1100 (shown in FIGS. 11A-11C).

Diverting for the moment, FIG. 19 depicts a flowchart of GFDI Fault Routine 1900. Given the serious nature of a ground fault condition, routine 1900 disables the microinverter, provides a failure indication and writes a GFDI Fault code to memory. This code will be subsequently checked by the next iteration through routine 800. As long as this code remains set (i.e., not cleared), routine 800 will simply route execution back to fault routine 1900, thus effectuating an infinite loop which keeps the microinverter disabled. For safety reasons—as a ground fault is a rare but serious failure condition, this code can only be cleared by suitable intervention of the manufacturer of the microinverter.

Specifically, upon entry into routine 1900, execution first proceeds to block 1910 which, when executed, disables both DC Converter 200 and Commutator 400, thus extinguishing the output current. Once that occurs, execution proceeds to block 1920 which provides an indication of this fault condition through a suitable annunciator (e.g., a buzzer and/or a visual indicator) situated on the housing of the microinverter, and, most importantly, write a GFDI Fault code into memory of the microcontroller to signify that a ground fault has just occurred. Thereafter, execution exits routine 1900 and proceeds to entry point A in Initialization and Initial Checks Routine 800 in an attempt re-initialize the microinverter. As discussed above, as long as this fault code is set, the microinverter enters an infinite loop throughout which the microinverter remains disabled.

Now returning to routine 800 and accompanying FIGS. 8A-8B, if decision block 825 determines that the GFDI signal does not exceeds its threshold, then that block routes execution, via NO path 829, to block 835. This latter block reads the GFDI fault condition from memory, i.e., whether the GFDI fault code has been set (i.e., stored) or not. Thereafter, execution proceeds to decision block 840 which tests for the stored GFDI fault code. If that code is currently stored (i.e., not cleared), then this decision block routes execution, via YES path 841, to block 830. That latter block, as noted, causes execution to unconditionally jump to GFDI Fault Routine 1900 (which, through its next iteration, once again sets the GFDI fault code in memory).

Alternatively, if no fault code is presently stored, then decision block 840 routes execution, via NO path 843, to block 845 which checks whether the panel output voltage is within a proper range as the microinverter will function properly only for panel output voltages that lie within a certain range. If the panel voltage is outside of the range, then this decision block routes execution, as a fault condition, via NO path 847 and then path 857, back to the entry point of routine 800 to re-initialize the microinverter. Alternatively, if the panel voltage is acceptable, then decision block 845 routes execution, via YES path 849, to block 850. This latter block checks the actual voltage and frequency of the utility grid to which the microinverter is connected. Decision block 855 then determines whether the grid voltage and frequency are proper for the region of the world where the microinverter is operating, i.e., are those values within the limits of the associated "learned" parameters. If not, then decision block routes execution, as a fault condition, via NO path 857, back to the entry point of routine 800 to re-initialize the microinverter. Alternatively, if the actual grid voltage and frequency are proper, then decision block 855 routes execution, via YES path 859, to block 860.

Block 860 invokes Measure VOC and Setup MPPT Parameters Routine 900. This routine, when executed, measures the open circuit voltage (VOC) produced by the PV panel (i.e., with no current draw, hence under no load) and then uses it to initialize the MPPT procedure. This procedure ensures that the PV panel is operating at a point on its characteristic curve at which maximum power is being generated. As will be discussed in detail below, the MPPT procedure employs two algorithms: Perturb and Observe (implemented through routine 1200 shown in FIG. 12), and Incremental Conductance (implemented through routine 1300 shown in FIG. 13) with the particular algorithm being used at any given time based on the amount of power then being produced by the PV panel. Once block 860 has fully executed, execution proceeds to block 870. This latter block executes Synchronize Zero Crossing and Phase Lock to Grid Routine 1000. In essence, this routine initially synchronizes and phase locks the operation of the sine index timer—which is based on operation of Phase-locked Timer 517—to the occurrence of actual zero crossings in the utility grid voltage and, in so doing, adjusts the operation of the Timer 517 accordingly. After routine 1000 complete, execution proceeds to block 880 which, in turn, enables both DC Converter 200 and Commutator 400. Thereafter, execution proceeds to Main Loop 1000 (via block 740 shown in FIG. 7). Subsequent adjustments, during execution of Main Loop 1000, to the operation of the sine index timer to maintain its synchronization and phase lock to zero crossings occurs through execution of Zero Crossing ISR 1400.

4. Measure VOC and Setup MPPT Parameters Routine 900

Figure 9:
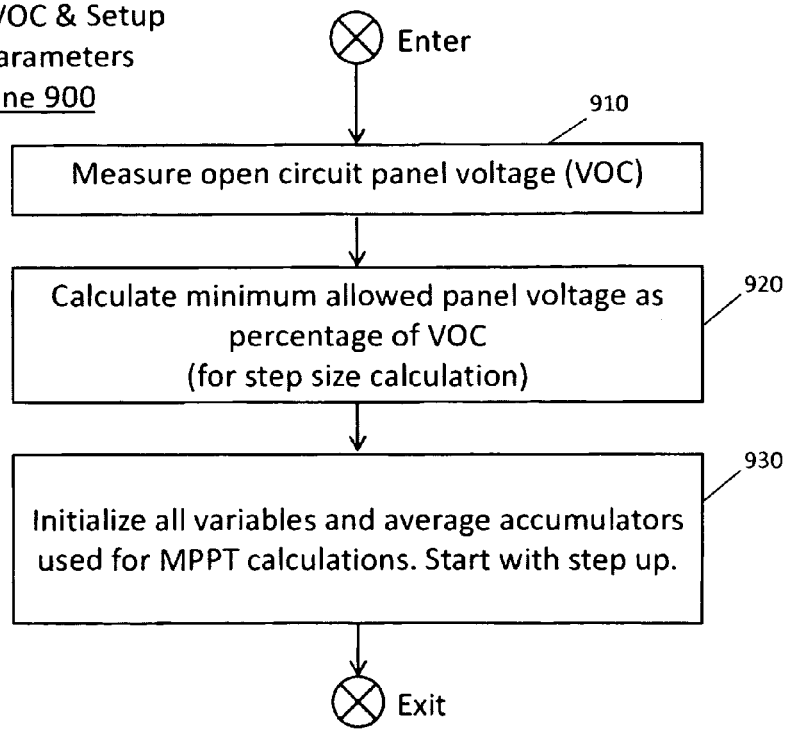
FIG. 9 depicts a flowchart of Measure VOC and Setup MPPT Parameters Routine 900 that is executed within Initialization and Initial Checks Routine 800 collectively shown in FIGS. 8A-8B.

FIG. 9 depicts a flowchart of Measure VOC and Setup MPPT Parameters Routine 900 that is executed within Initialization and Initial Checks Routine 800 collectively shown in FIGS. 8A-8B. This routine, when executed, measures the open circuit voltage produced by the PV panel and then uses it to initialize the MPPT procedure such that the PV panel is operating at a point on its characteristic curve at which maximum power is being generated.

Upon entry into this routine, execution first proceeds to block 910 which measures the open circuit voltage then being produced by the PV panel. Once this occurs, execution proceeds to block 920 which calculates a minimum allowed PV panel voltage as a percentage of VOC. This minimum amount is used for calculating step size for subsequent use in the MPPT procedure. Next, execution proceeds to block 930 which initializes all variables and average value accumulators used in MPPT calculations. A flag is set such that the first iteration through those calculations uses a "step up". Initially, while the PV output power is increasing from zero, the Perturb and Observe algorithm is used to find peak PV panel output power. This algorithm, as described in detail below, essentially uses a trial and error process to find the peak. During each iteration through that algorithm, a panel voltage set-point ($V_{MPPT}$) is either incremented up or down, by the step size, based on result from the immediately prior iteration through that algorithm. When the output power produced by the PV panel exceeds 10% of its rated output, then the MPPT procedure switches over to using the Incremental Conductance algorithm rather than the Perturb and Observe algorithm. The former algorithm results in more stable operation of the MPPT procedure than the latter algorithm, though, at lower power levels, the latter algorithm provides an output that increases more rapidly than would the Incremental Conductance algorithm.

5. Synchronize Zero Crossing & Phase Lock to Grid Routine 1000

Figure 10:
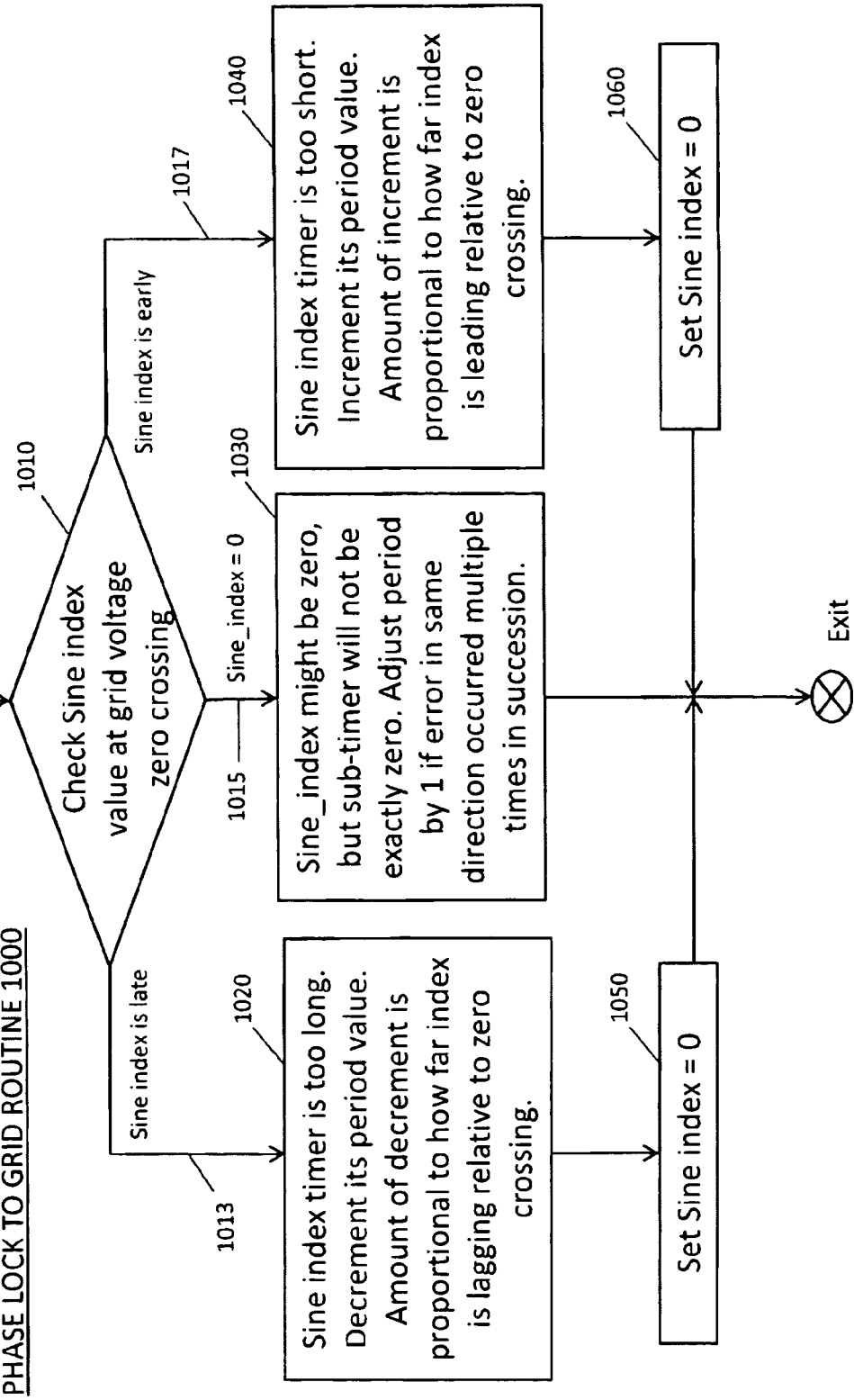
FIG. 10 depicts a flowchart of Synchronize Zero Crossing and Phase Lock to Grid Routine 1000 that is executed within Initialization and Initial Checks Routine 800 collectively shown in FIGS. 8A-8B.

FIG. 10 depicts a flowchart of Synchronize Zero Crossing and Phase Lock to Grid Routine 1000 that is executed within Initialization and Initial Checks Routine 800 collectively shown in FIGS. 8A-8B. Routine 1000 provides initial synchronization and phase locking of the operation of the sine index timer—which is based on operation of Phase-locked Timer 517—to the occurrence of actual zero crossings in the utility grid voltage and, in so doing, adjusts the operation of the Timer 517 accordingly. Thus, the period of Timer 517 exactly matches that of the sinusoidal grid voltage. This period is then divided into 256 increments each of which is used as an address (sine index timer) into a look-up table that stores a reference sinusoidal waveform. The output of this table, as noted previously, is used by Main Loop 1100 in subsequently calculating the Current Command. Since this routine is only executed during the initialization phase (i.e., during execution of routine 800), subsequent adjustments, during execution of Main Loop 1000, to the operation of this timer to maintain its synchronization and phase lock to zero crossings occurs, as noted above, through execution of Zero Crossing ISR 1400.

Upon entry into routine 1000 which occurs at an edge of each positive-going zero crossing in the grid voltage (i.e., when the actual phase is zero), execution proceeds to decision block 1010 which checks the current value of the sine index timer at the zero crossing in the actual sinusoidal grid voltage (i.e., when that phase of that voltage is zero). Three options exist: if the sine index is occurring later or earlier than the zero crossing, or the two are completely in phase (i.e., both the sine index and the actual phase are zero at the same time).

In the event that the sine index is lagging the zero crossing, i.e., the sine index reaches zero after the actual zero crossing, then decision block 1010 routes execution, via path 1013, to block 1020. There, the period associated with the sine index timer is decremented (to shorten the period) in proportion to the amount of time that the sine index is lagging the zero crossing. Once this occurs, execution proceeds to block 1050 where the current value (Sine index) of the sine index timer is set to zero. Thereafter, execution exits from routine 1000.

Alternatively, if decision block 1010 determines that the sine index is leading the zero crossing, i.e., the sine index reaches zero before the actual zero crossing, then decision block 1010 routes execution, via path 1017, to block 1040. There, the period associated with the sine index timer is incremented (to lengthen the period) in proportion to the amount of time that the sine index is leading the zero crossing. Once this occurs, execution proceeds to block 1060 where the current value (Sine index) of the sine index timer is set to zero. Thereafter, execution exits from routine 1000.

Lastly, if decision block 1010 determines that the sine index and the zero crossing are in-phase with each other, then that block routes execution, via path 1015, to block 1030. In such an instance, while these two parameters may be synchronized and zero-valued, a value then stored in a sub-timer (not shown), driven by the sine index timer, may not be exactly zero. Consequently, if prior to this in-phase condition, a lagging/leading synchronization error had occurred multiple times in succession and in the same direction between the sine index timer and corresponding zero crossings, then the period of the sine index counter is varied by one in an appropriate direction (decremented/incremented) to synchronize the sub-timer as well to the zero crossing and ensure that not only the sine index timer but also the sub-timer remain synchronized to the zero crossing. Once this occurs, execution simply exits from routine 1000.

6. Main Loop 1100

Figure 11B:
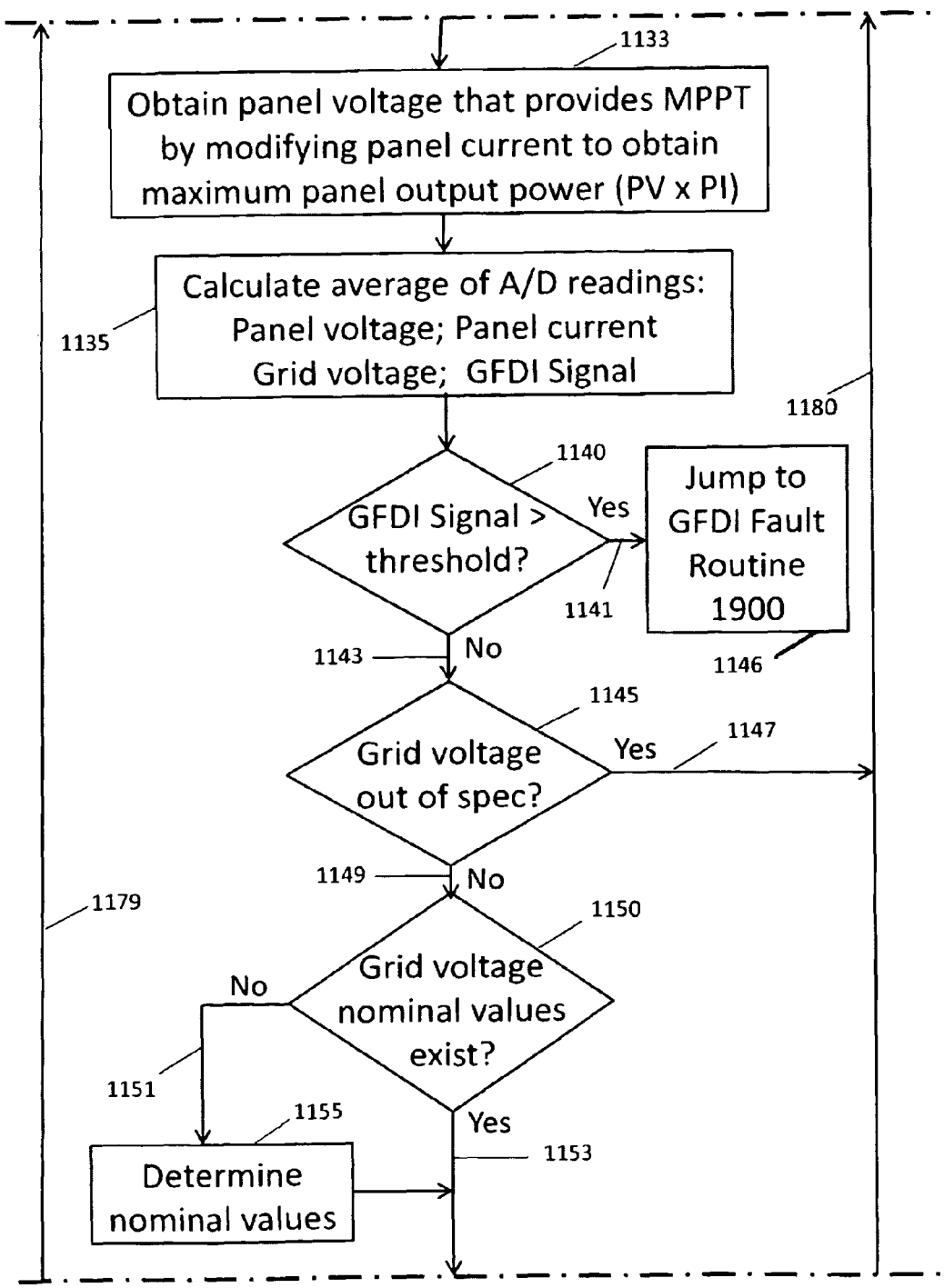
FIGS. 11A-11C collectively depict a flowchart of Main Loop 1100 which is executed within Overall Execution Threads 700 shown in FIG. 7; with FIG. 11 depicting the correct alignment of the drawing sheets for FIGS. 11A-11C.
Figure 11C:
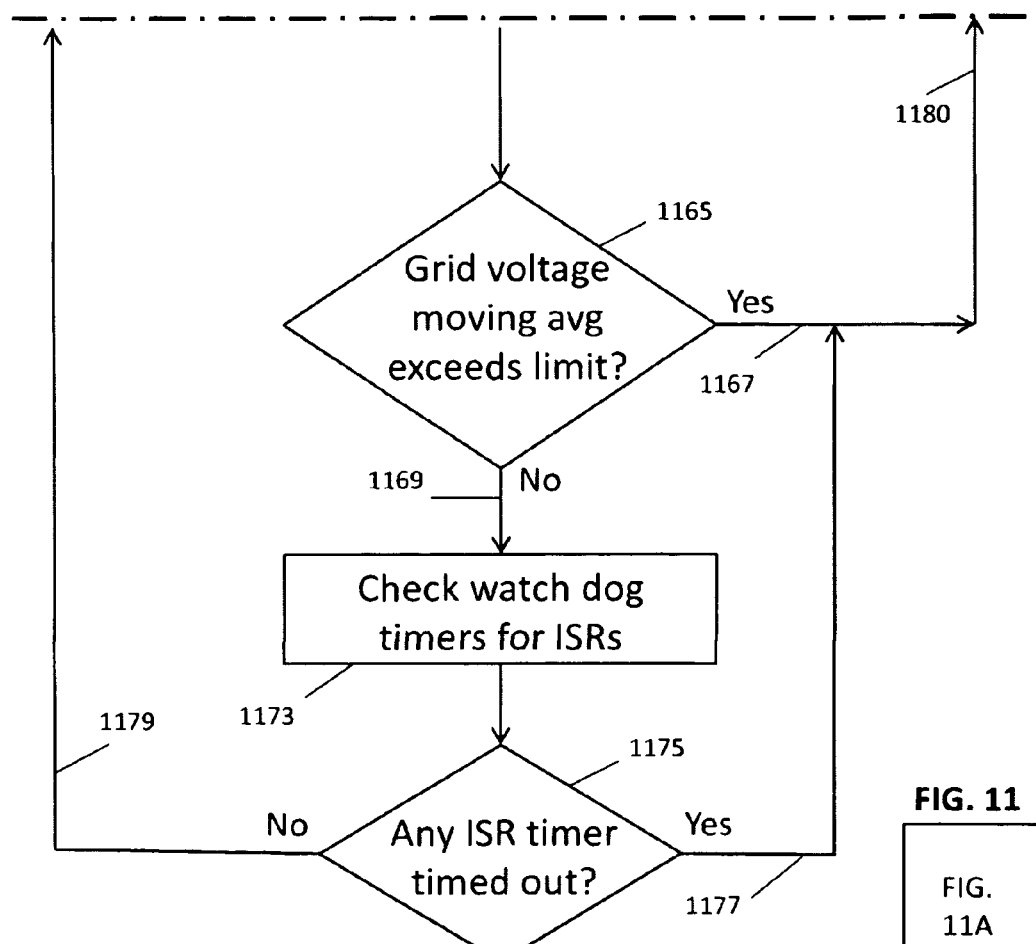
Figure 11:
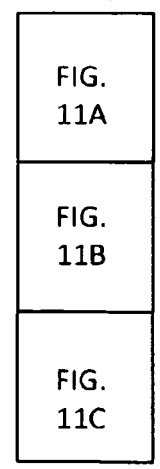

FIGS. 11A-11C collectively depict a flowchart of Main Loop 1100 which is executed within Overall Execution Threads 700 shown in FIG. 7; with FIG. 11 depicting the correct alignment of the drawing sheets for FIGS. 11A-11C. As noted previously, during normal operation, microcontroller 500 will expend most of its processing time in repeatedly iterating through within this loop. Loop 1100 provides the main control over the microinverter and performs various real-time operating parameter checks.

As shown, upon entry into loop 1100, execution first proceeds to block 1105. This block checks status of the Aux Good signal appearing on lead 15 (See FIGS. 1 and 5) which reflects whether the levels of all the voltages produced by Auxiliary Power Supply 10 are proper. Block 1105 then checks the PV panel voltage to ensure that its level is also proper, i.e., above a predefined minimum value. This minimum value is programmed into the microcontroller during manufacture of the microinverter. If any of these voltages is not proper, i.e., the Aux Good signal has an error status or the panel voltage is too low, then decision block 1110 routes execution, via NO path 1111 back to the entry point in Routine 800 to re-start and re-initialize operation of the microinverter.

Alternatively, if all these voltages are proper, then decision block 1110 routes execution, via YES path 1113, to block 1115. This latter block, when executed, performs Sudden Shadow Detection Routine 1700.

As discussed above, when a shadow of as little as 5% is cast on the PV panel in terms of the area of the panel subtended by the shadow, the power then being produced can decrease by as much as 90% and basically causing the panel output voltage to collapse. Here, the power output of the panel can drop faster than the MPPT procedure can track it. To avoid an over-current cutout and a commensurate hard restart of the DC converter 200, the microcontroller 500 monitors the microinverter output current to detect an over-current condition. Depending on the magnitude of the over-current, the microcontroller will perform either a hard or a soft shutdown of the microinverter. However, sudden shadows, which are often transient phenomena, can manifest themselves as soft over-current events. To permit proper overall operation, the microcontroller must correctly infer from current operating parameters that a sudden shadow has occurred and thus command a soft shutdown, with a suitable automatic restart of pulse width modulator 220 (see FIG. 2) and output current generation, after expiration of a delay interval predicated on an RC time constant.

Routine 1700, which is discussed in detail below in conjunction with FIG. 17, measures and compares the actual output power produced by the PV panel against the power then being requested to detect a shadow event and, if one just occurred, lower the requested output power to a minimum value. Once the delay interval has expired, the requested power will be increased from that minimum value to a then desired amount.

Once routine 1700 has executed, execution proceeds from block 1115 to block 1120. The latter block, when executed, multiplies the reference sine wave value (determined through look-up into the stored sine table using the current Sine index as an address). The MMPT value specifies the amount of power then being requested from the microinverter. The resulting value is supplied, in 12-bit form, to D/A converter 520 (see FIG. 5) for conversion into the analog Current Command appearing on lead 52.

Thereafter and as shown in FIG. 11A, execution proceeds to block 1125 which, every two seconds, performs an "anti-islanding" check, i.e., that, if utility grid voltage is removed for any reason (such as a power failure somewhere in the grid resulting from, e.g., a downed line in the vicinity of the microinverter installation), the microinverter does not function as a sole power source. Should that happen the power produced by the microinverter may well pose a safety hazard to any utility line personnel then working on remedying the downed line and restoring power. To prevent any such situation from arising, block 1125 reduces the output power level to 87.5% for a period of two 60 Hz cycles and monitors the utility grid voltage. If the grid voltage, which is normally very rigid, were to drop sufficiently, then this likely indicates that the grid voltage is lost and a utility power failure exists. In that case, block 1125 will invoke a hard shut-down (and eventual re-start) of the microinverter.

Next, execution proceeds to block 1133 which varies the panel current accordingly to yield a panel voltage, based on the characteristic curve of the PV panel, at which maximum output power (Panel current (PI)×Panel voltage (PV)) is being generating by the panel. As such, this modifies the actual operating point of the PV panel in order for it to ultimately attain and maintain its MPPT value. The present incremental change in its current operating value, if any, needed for the panel to eventually reach or remain at its MPPT value has been determined through the immediately prior iteration through the MPPT procedure executed through Zero Crossing ISR 1400. Once this current has been established, then execution proceeds to block 1135 which calculates average values for the various analog inputs to the microcontroller, specifically panel voltage, panel current, grid voltage and GFDI signal. To substantially eliminate the effects of noise, average values are taken over a span of at least 64 measurements occurring during the duration of a power cycle with the microcomputer using the average, rather than instantaneous, values in subsequent analysis and decision-making.

Thereafter, block 1140 is executed to determine whether the GFDI (ground fault detection interruption) signal exceeds its corresponding threshold. That threshold, as noted, is close to zero. If the threshold is exceeded, hence indicative of a ground fault condition, then this decision block routes execution, via YES path 1141, to block 1146. This latter block causes execution to unconditionally jump to GFDI Fault Routine 1900 (previously discussed above in conjunction with block 830) to disable the microinverter. Alternatively, if the GFDI signal does not exceed its threshold, then decision block 1140 routes execution, via NO path 1143, to decision block 1145. This latter decision block determines whether the grid voltage exceeds a maximum (over-voltage) limit. If it does, then decision block 1145 routes execution, via YES path 1147 and path 1180, back to the entry point of Initialization and Initial Checks Routine 800 to re-start and re-initialize the microinverter.

Alternatively, if the grid voltage does not exceed its limit value, then decision block 1145 routes execution, via NO path 1149, to decision block 1150. Blocks 1150 through 1165 determine whether the grid voltage meets another test, specifically whether its moving average taken over the preceding 10 minutes, is less than a corresponding limit value. This test, based on a 10-minute moving average, is substantially unaffected by voltage transients that appear on the utility grid. During manufacture of the microinverter, no limits are initially set. When the inverter is first powered up and reaches half power, it will measure the grid voltage present and set this as nominal. Grid voltage limits (high and low are based on a microinverter destined for either the US or Europe) are then calculated and stored in the Flash memory of the microcontroller. This "learning" of grid voltage occurs in block 1155 after which execution will proceed to block 1165. Alternatively, should these nominal values exist—which after manufacture is completed will always occur, then decision block 1150 will simply direct execution, via YES path 1153, to decision block 1165 which determines whether a 10-minute moving average of the grid voltage exceeds a corresponding predefined limit. If this limit is exceeded, then this decision block routes execution, via YES path 1167 and path 1180, back to the entry point of Initialization and Initial Checks Routine 800 to re-start and re-initialize the microinverter. Alternatively, if the limit is not exceeded, decision block 1165 routes execution, via NO path 1169, to block 1173.

Block 1173 checks the status of the hardware watch-dog timers associated with both ISRs in order to assure that neither timer has timed out. If such a time out has occurred, then the associated ISR has not reset the timer and hence is probably not operating, thus indicative of a failure condition. Consequently and in the event of a time-out condition, decision block 1175 would route execution, via YES path 1175 and path 1180, back to the entry point of Initialization and Initial Checks Routine 800 to re-start and re-initialize the microinverter. Alternatively, if neither timer has timed out, then decision block 1175 routes execution, via NO path 1179, back to block 1105 for a next successive iteration through the Main Loop.

7. Perturb and Observe Routine 1200

Figure 12:
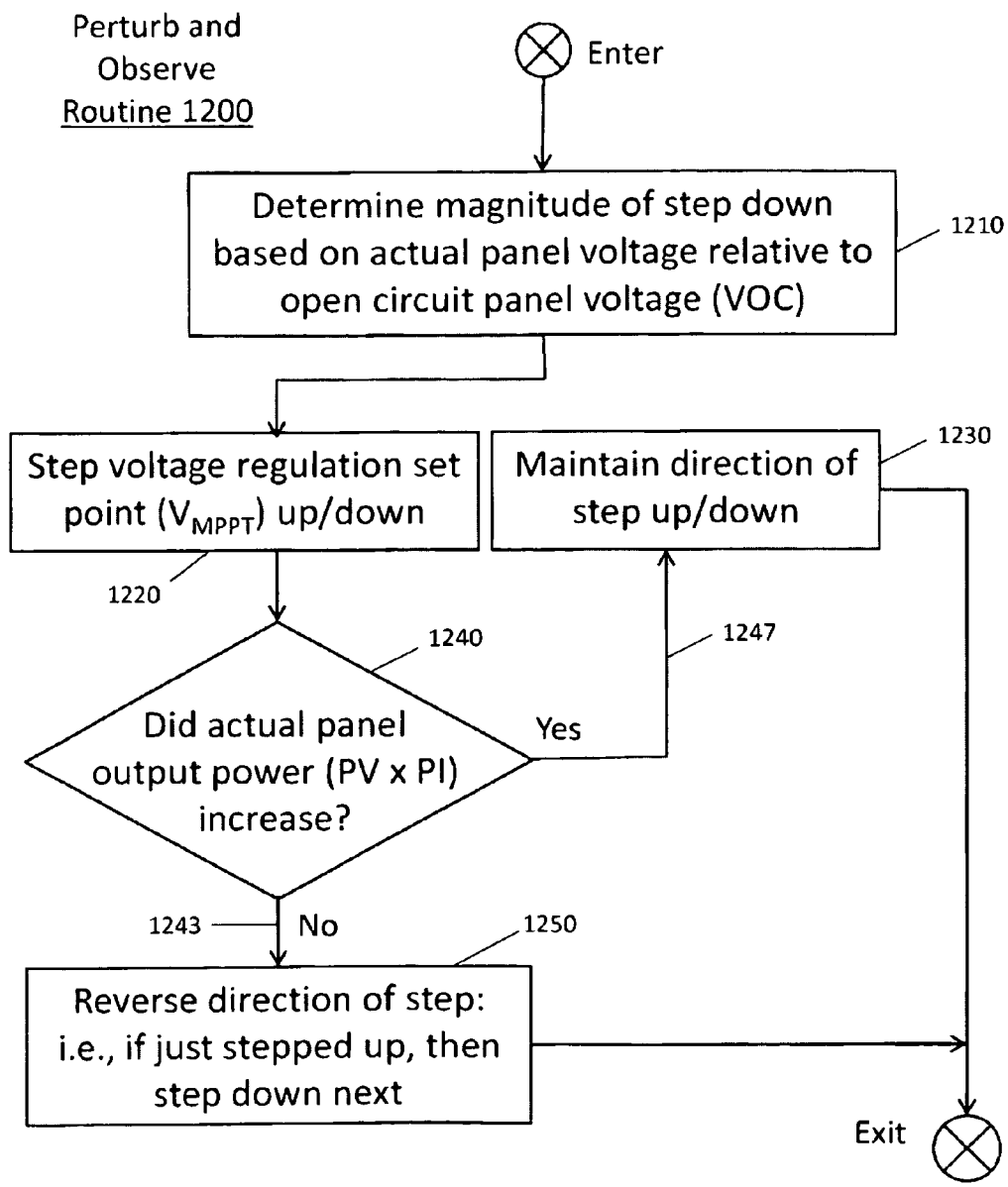
FIG. 12 depicts a flowchart of Perturb and Observe Routine 1200 that is executed within Main Loop 1100 shown collectively in FIGS. 11A-11C.

FIG. 12 depicts a flowchart of Perturb and Observe Routine 1200 that is executed within Main Loop 1100 shown collectively in FIGS. 11A-11C. As noted above, this routine implements the Perturb and Observe algorithm which essentially uses a trial and error process to find the MPPT peak. During each iteration through that algorithm, a voltage regulation set-point ($V_{MPPT}$) is either incremented up or down, by the step size, based on result from the immediately prior iteration through that algorithm. This algorithm produces an output that, at relatively low panel output power levels, increases more rapidly than that of the Incremental Conductance algorithm. Once this set-point is determined, block 1133 in Main Loop 1100 then actually modifies the panel current to implement that incremental change.

Specifically, upon entry into routine 1200, execution proceeds to block 1210. This block determines the magnitude of a step down voltage increment relative to the open circuit panel voltage (VOC). Next, execution proceeds to block 1220 which steps a voltage regulation set point ($V_{MPPT}$) up or down based on an existing step direction (stored through the prior iteration through routine 1200). Then, execution proceeds to decision block 1240 to determine whether the actual panel output power increased. If the power did increase—reflecting that the MPPT point has not yet been reached, then this decision block routes execution, via YES path 1247, to block 1230 which maintains the current step direction for the next iteration through this routine, after which execution exits from this routine.

If the output power did not increase—reflecting that the MPPT point may have just been passed, then decision block 1240 routes execution, via NO path 1243, to block 1250. This latter block reverses the step direction for use during the next iteration through routine. For example, if the immediately prior step was up, i.e., to incrementally increase the set point, then the next step will be down by the same increment (and vice versa) to incrementally decrease the set point voltage. Once block 1250 executes, execution simply exits from this routine.

8. Incremental Conductance Routine 1300

Figure 13:
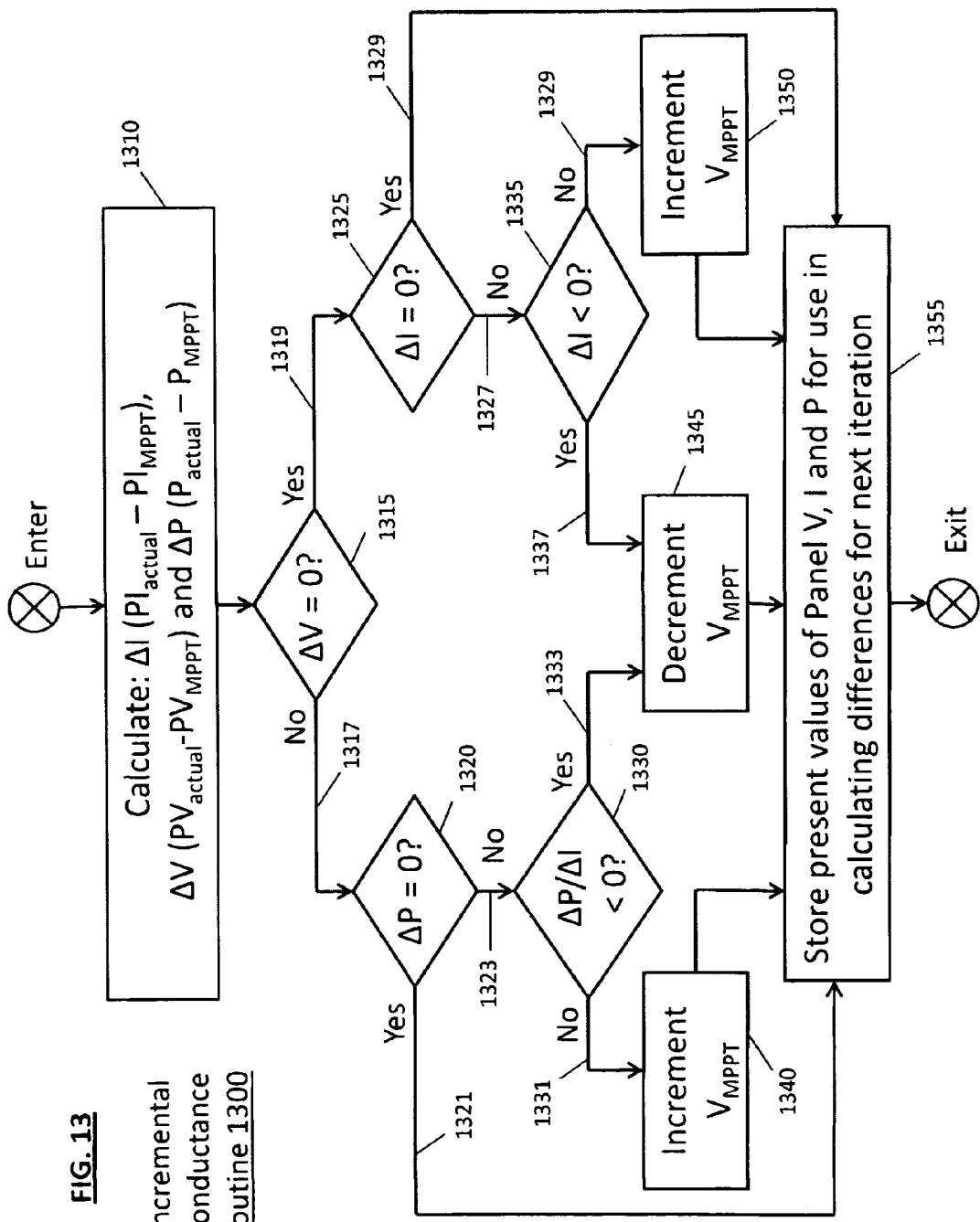
FIG. 13 depicts a flowchart of Incremental Conductance Routine 1300 that is also executed within Main Loop 1100 collectively shown in FIGS. 11A-11C.

FIG. 13 depicts a flowchart of Incremental Conductance Routine 1300 that is also executed within Main Loop 1100 collectively shown in FIGS. 11A-11C. As discussed previously, the incremental conductance algorithm, as implemented by this routine, is employed to find the MPPT point whenever the output power produced by the panel exceeds 10% of its rated output. In locating the MPPT point, the Incremental Conductance algorithm, as implemented in routine 1300, is operationally more stable than the Perturb and Observe algorithm. Here too, once the incremental change in the panel operating point is determined, block 1133 in Main Loop 1100 then actually modifies the panel current accordingly to implement that change.

Upon entry into this routine, execution first proceeds to block 1310. This block calculates differences ($\Delta I$, $\Delta V$ and $\Delta P$) between the actual panel current ($PI_{actual}$), panel voltage ($PV_{actual}$) and panel output power ($P_{actual}$) and their corresponding MPPT panel voltage ($PV_{MPPT}$), MPPT panel current ($PI_{MPPT}$) and panel output power ($P_{MPPT}$). These MPPT values have been determined through the prior iteration of either routines 1200 or 1300, whichever executed most recently.

Once these differences have been determined, execution proceeds to test each of these differences and increment or decrement the $V_{MPPT}$ value accordingly, and then store the present values of panel voltage, current and output power for use in the next iteration through routine 1300.

Specifically, execution proceeds to decision block 1315 to test whether no voltage difference, $\Delta V$, exists between the panel voltage and $V_{MPPT}$. If no such voltage difference exists, then this decision block routes execution, via YES path 1319, to decision block 1325. This latter block tests whether a current difference, $\Delta I$, exists between the panel current and $I_{MPPT}$. If no such current difference exists, then decision block 1325 simply routes execution, via YES path 1329, to block 1355. This latter block stores the present values of panel voltage, current and output power for subsequent use in determining corresponding differences during the next iteration through routine 1300. Once block 1355 completely executes, execution exits from this routine. Alternatively, if the current difference is non-zero, then decision block 1325 routes execution, via NO path 1327, to decision block 1337. This latter block tests whether the current difference is negative. If it is not, then decision block 1335 routes execution, via NO path 1329, to block 1350 which increments the value of $V_{MPPT}$ by the previously determined step size. Once this operation completes, execution proceeds to block 1355 and thereafter exits from routine 1300. Alternatively, if the current difference is negative, then decision block 1335 routes execution, via YES path 1337, to block 1345 which decrements the value of $V_{MPPT}$ by this step size, after which block 1355 is executed and thereafter execution exits from this routine.

If however the voltage difference is non-zero, then decision block 1315 routes execution, via NO path 1317, to decision 1320. This latter block tests whether a power difference, $\Delta P$, exists between the panel output power and $P_{MPPT}$. If no such power difference exists, then decision block 1320 simply routes execution, via YES path 1321, to block 1355. After block 1355 fully executes, execution exits from routine 1300. Alternatively, if the power difference is non-zero, then decision block 1320 routes execution, via NO path 1323, to decision block 1330. This latter block tests whether the ratio of the power difference to the current difference, i.e., the difference in resistance, is negative. If it is not, then decision block 1330 routes execution, via NO path 1331, to block 1340 which increments the value of $V_{MPPT}$ by this step size. Once this operation completes, execution proceeds to block 1355 and thereafter exits from routine 1300. Alternatively, if the ratiometric difference is negative, then decision block 1330 routes execution, via YES path 1333, to block 1345 which decrements the value of $V_{MPPT}$ by this step size after which block 1355 is executed and thereafter execution exits from this routine.

9. Zero Crossing ISR 1400

Figure 14:
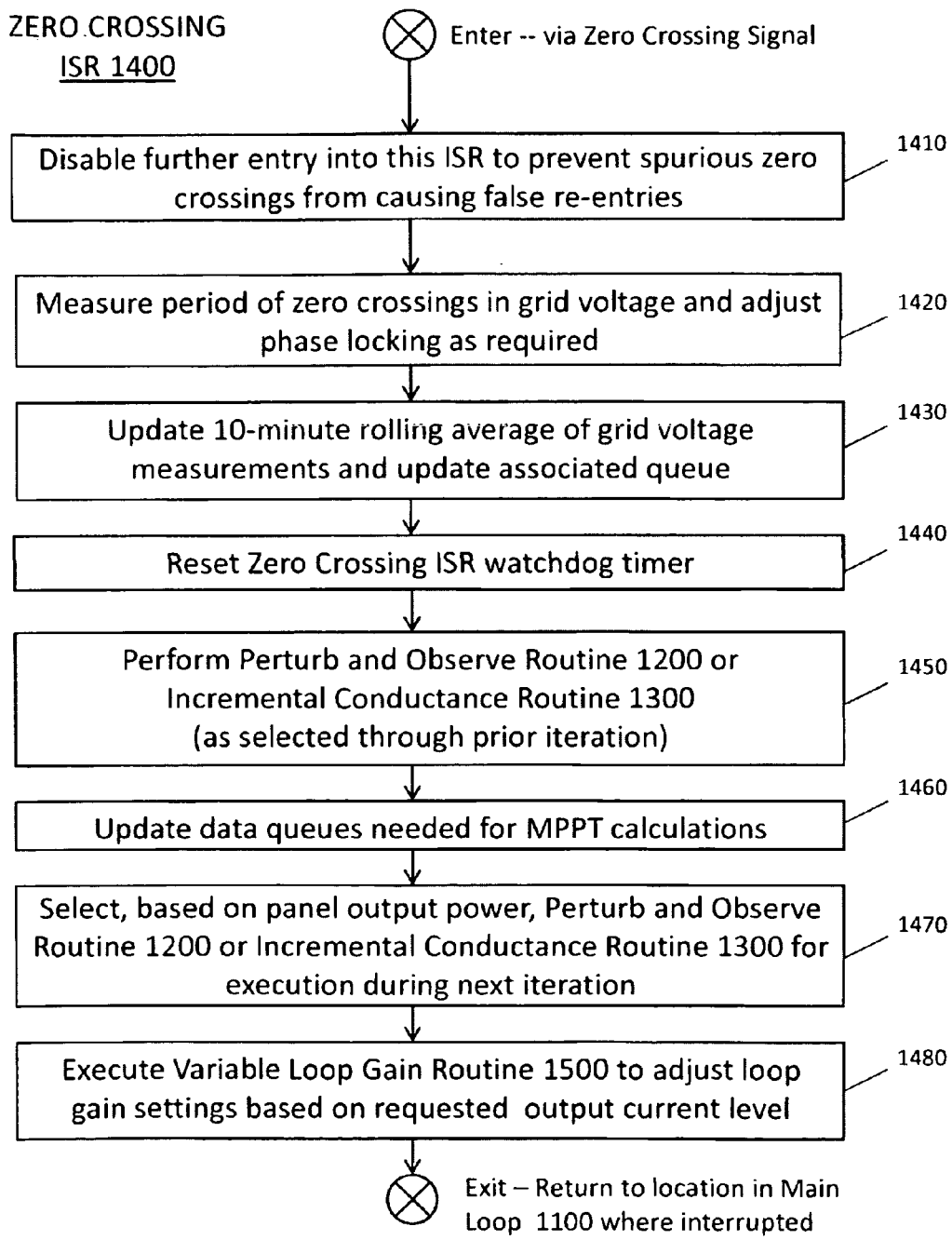
FIG. 14 depicts a flowchart of Zero Crossing Interrupt Service Routine (ISR) 1400 which is executed within Overall Execution Threads 700 shown in FIG. 7.

FIG. 14 depicts a flowchart of Zero Crossing ISR 1400 which is executed within Overall Execution Threads 700 shown in FIG. 7. As noted previously, this interrupt service routine primarily measures the period between the present and immediately prior zero crossings (both positive and negative going) and adjusts the phase locking of Timer 517 as necessary to maintain synchronization between the timer operation and the zero crossings, performs MPPT calculations to determine whether the PV panel is still operating at its peak power point, and adjusts the loop gain control value by an appropriate 2-bit value, applied to lead 58 (see FIGS. 1 and 2), based on the level of the output current level then being requested from the microinverter.

Upon entry into ISR 1400 (as shown in FIG. 14) at the occurrence of a zero crossing in the utility grid voltage (as reflected by the zero crossing signal), execution proceeds to block 1410. This block disables further entry into this ISR in order to prevent noise or other transients which may cause spurious zero crossings from causing invalid and false re-entries into this ISR. This ISR is re-enabled during execution of Sine Index ISR 1600, which will be described below in conjunction with FIG. 16. One the Zero Crossing ISR is disabled, execution proceeds to block 1420 which measures the period between the present zero crossing and the immediately preceding crossing and suitably adjusts the sine timer accordingly to maintain synchronization with and phase lock to the present zero crossing.

Next, execution proceeds to block 1430 which updates a 10-minute rolling average of grid voltage measurements with the latest grid voltage measurement to yield the latest such average value (which is tested through decision block 1165 in Main Loop 1100—as discussed above in conjunction with FIGS. 11A-11C), and then updates an associated queue of these average values with that latest average value for use in a next subsequent update calculation of the rolling average. Once block 1430 has fully executed, block 1440 executes to reset the Zero Crossing watch-dog timer. During normal operation, this timer is set to a predefined interval (the length of which is not critical) such that the timer will not time out before it is reset and thus indicates that ISR 1400 is repeatedly being executed.

Thereafter, execution proceeds to block 1450 which performs the MPPT procedure. This involves executing either the Perturb and Observe algorithm (via Perturb and Observe Routine 1200) or the Incremental Conductance algorithm (via Incremental Conductance Routine 1300), with the selection of which one to use having been made, via execution of block 1470 (as will shortly be discussed) in the immediately preceding iteration through the Main Loop. The result of executing block 1450 will be an incremental change in the current operating point of the PV panel in order for the panel to attain or subsequently maintain its MPPT value. Once block 1450 fully executes, block 1460 is executed to update data queues with various parameter values potentially needed for a next successive iteration through the MPPT procedure. As such, through successive iterations of the MPPT procedure in conjunction with Main Loop 1100, that procedure will essentially track normal variations in panel illumination over the course of a day (i.e., the microinverter will automatically shut down, as discussed above, if the panel output voltage is too low) and adjust the panel's actual operating point to be coincident with its MPPT point in order thus assuring that substantially its maximum output power, for the current illumination, is always being harvested.

Once this occurs, execution proceeds to block 1170, which selects based on the instantaneous amount of power being produced by the PV panel whether to select the Perturb and Observe algorithm (routine 1200) or the Incremental Conductance algorithm (routine 1300) for use during the next successive iteration of the MPPT procedure (i.e., during the next successive execution of Zero Crossing ISR 1400). As noted, if the output power is then 10% or less of the maximum rate power, then the Perturb and Observe algorithm is selected; otherwise, for all higher power levels, the Incremental Conductance algorithm is selected. After block 1470 executes, block 1480 executes Variable Loop Gain Routine 1500 which, depending on the output current then being requested, sets the 2-bit loop gain control value, applied to leads 58 (see FIGS. 2 and 5), accordingly. Thereafter, execution exits from this ISR and returns to the point in Main Loop 1100 at which execution had been interrupted.

10. Variable Loop Gain Routine 1500

Figure 15:
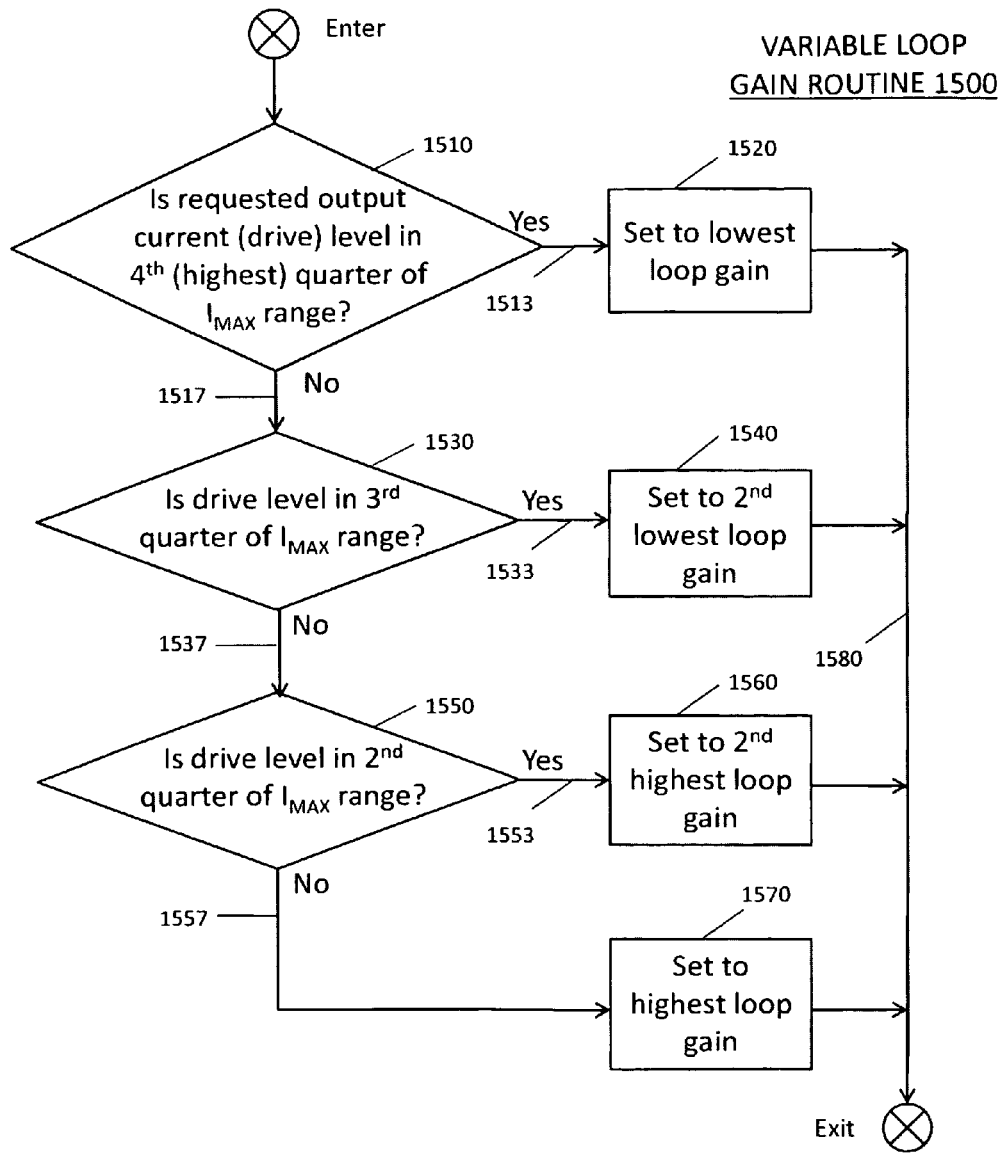
FIG. 15 depicts a flowchart of Variable Loop Gain Routine 1500 which is executed with Zero Crossing ISR Routine 1400 shown in FIG. 14.

FIG. 15 depicts a flowchart of Variable Loop Gain Routine 1500 which is executed with Zero Crossing ISR Routine 1400 shown in FIG. 14. This routine, as noted, sets the loop gain control signal based on the current magnitude of the output current being produced by the microinverter relative, on a quartile ranking, to its full rated output current. The range of output (drive) current is divided into four quartiles. The highest quartile carries the lowest value of Loop Gain Control; the lowest quartile carries the highest value, and so forth for the middle two quartiles.

Upon entry into routine 1500, execution proceeds to decision block 1510 which determines whether the current magnitude of the output current lies within the highest quartile (100-75%). If so, then execution proceeds, via YES path 1513, to block 1520 which sets the loop gain control signal to its lowest value. Thereafter, execution exits, via path 1580, from routine 1500. Alternatively, if the magnitude of the output current is not in the highest quartile, then decision block 1510 routes execution, via NO path 1517, to decision block 1530. This latter block determines whether the magnitude of the output current lies within the third quartile (50-75%). If so, then execution proceeds, via YES path 1533, to block 1540 which sets the loop gain control signal to its second lowest value. Thereafter, execution exits, via path 1580, from routine 1500. Alternatively, if the magnitude of the output current is not in the third quartile, then decision block 1530 routes execution, via NO path 1537, to decision block 1550. This latter block determines whether the magnitude of the output current lies within the second quartile (50-25%). If so, then execution proceeds, via YES path 1553, to block 1560 which sets the loop gain control signal to its second highest value. Thereafter, execution exits, via path 1580, from routine 1500. Alternatively, if the magnitude of the output current is not in the third quartile, then decision block 1530 routes execution, via NO path 1557, to block 1570 which sets the loop gain control signal to its highest value. Thereafter, execution exits, via path 1580, from routine 1500.

11. Sine Index ISR 1600

Figure 16:
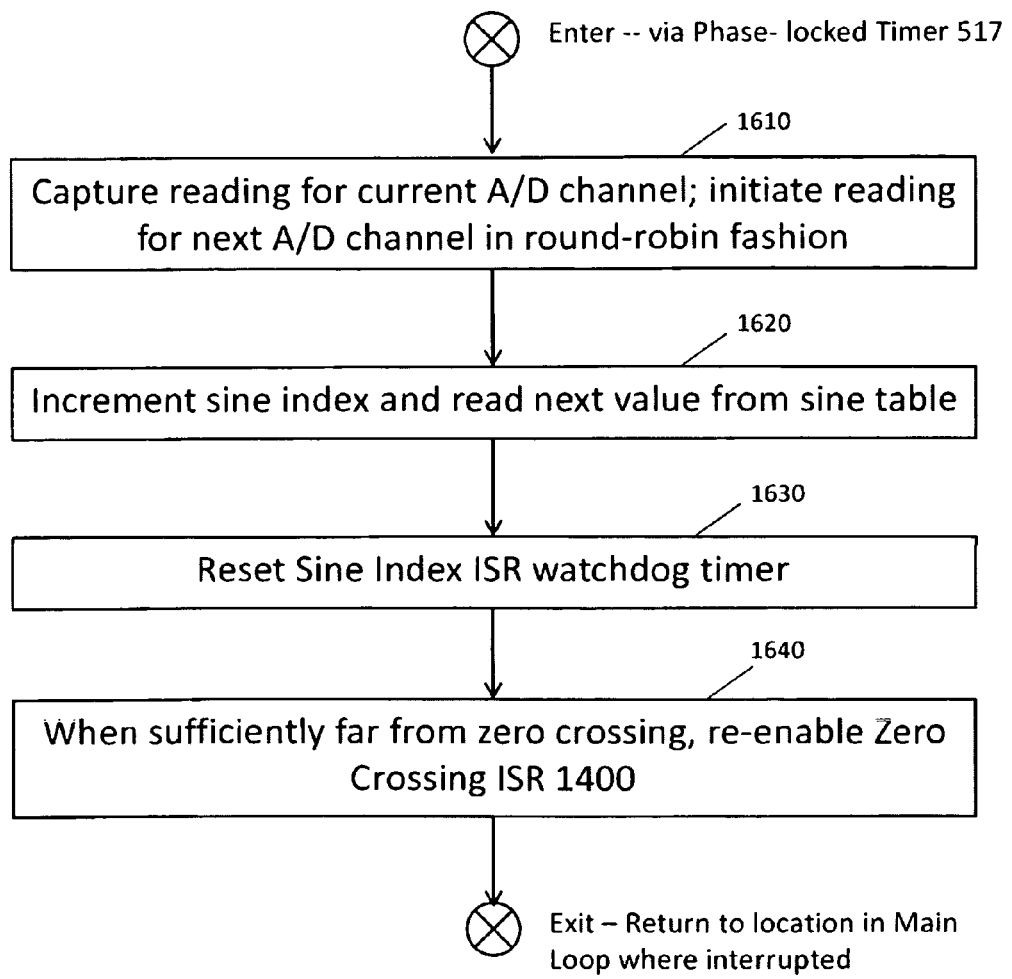
FIG. 16 depicts a flowchart of Sine Index ISR 1600 which is executed within Overall Execution Threads 700 shown in FIG. 7.

FIG. 16 depicts a flowchart of Sine Index ISR 1600 which is executed within Overall Execution Threads 700 shown in FIG. 7. As previously noted, this ISR primarily increments the sine index counter (Sine index) to point to a next successive value in the sine table and then reads that value out for subsequent use by Main Loop 1100 in calculating the requested output current.

Specifically, Routine 1600 is entered as result of the occurrence of a timing pulse from Phase-locked Timer 517. This pulse marks the beginning of each of 256 successively occurring increments into which the period of each sinusoidal waveform of the utility grid voltage is effectively divided and to which Timer 517 is phase-locked. The value of the increment is used an address into the sine table to access a corresponding value on the stored reference sinusoidal waveform. The output of this table, as noted previously, is used by Main Loop 1100 in subsequently calculating the Current Command.

Within routine 1600, execution first proceeds to block 1610 which reads an analog input value (of which four are shown in FIG. 5) applied to a currently selected channel of Multi-channel A/D Converter 513 and stores that value for subsequent use. These channels are cycled through to obtain measurements in a round-robin fashion during successive iterations of ISR 1600. Accordingly, once the current channel is read, block 1610 selects the next channel for reading during the next successive iteration of this ISR, and so forth. Once block 1610 fully executes, execution proceeds to block 1620 which increments the sine index counter by one and uses the resulting count as an address into the sine table to access the next successive value in that table.

Once the sine value has been accessed, block 1630 executes to reset the watch-dog timer for the Sine Index ISR. Thereafter, block 1640 executes which, after a suitable time period has elapsed from the most recently occurring zero crossing, re-enables Zero Crossing ISR 1400. This period, though not critical, is typically set to approximately +33 degrees of phase relative to the occurrence of the crossing. Once block 1640 executes, execution exits from ISR 1600 and returns to the point in Main Loop 1100 at which execution had been interrupted.

12. Sudden Shadow Detection Routine 1700

Figure 17:
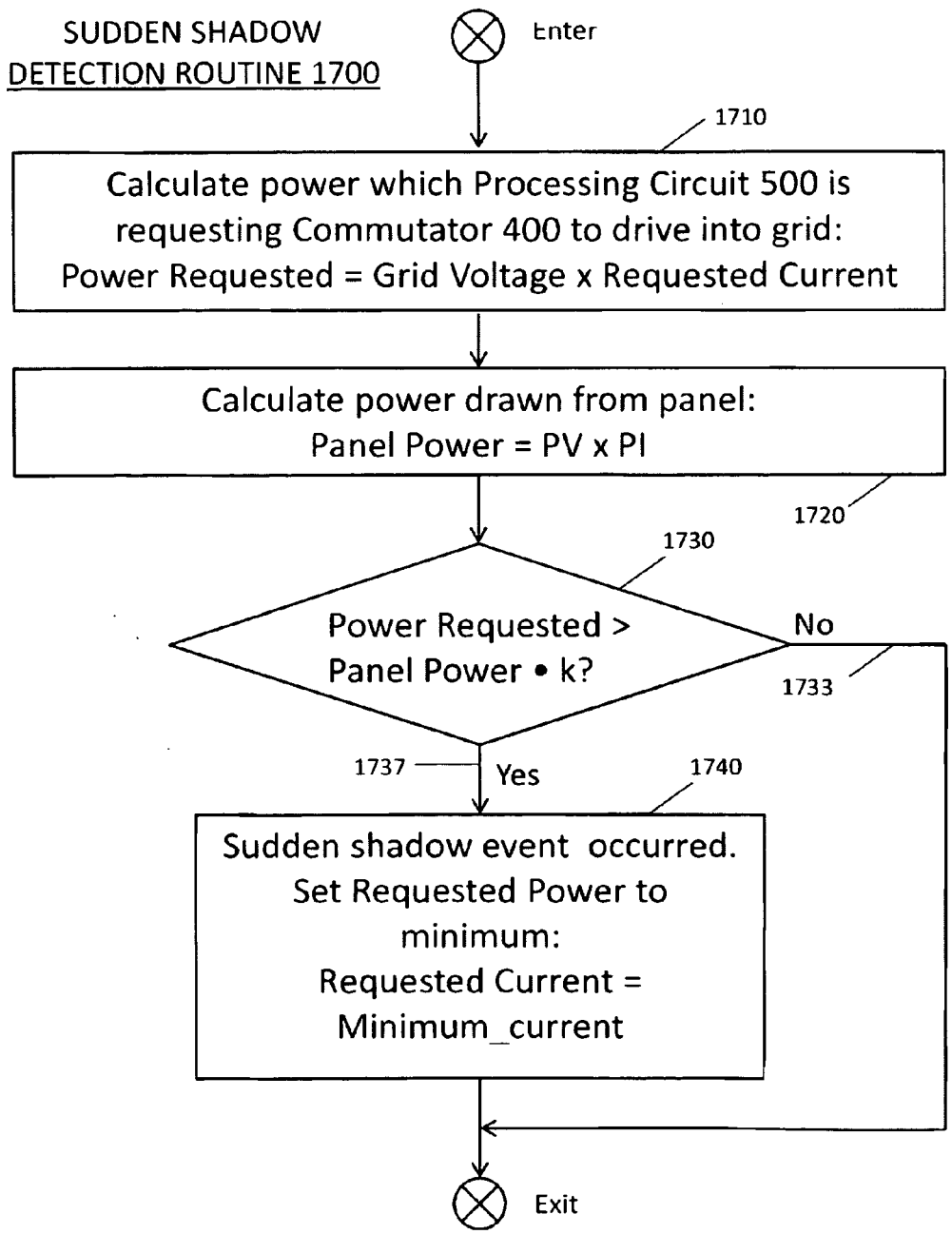
FIG. 17 depicts a flowchart of Sudden Shadow Detection Routine 1700 which is executed within Main Loop 1100 collectively shown in FIGS. 11A-11C.

FIG. 17 depicts a flowchart of Sudden Shadow Detection Routine 1700 which is executed within Main Loop 1100 collectively shown in FIGS. 11A-11C. As noted above, this routine measures and compares the actual output power produced by the PV panel against the power then being requested to detect a shadow event and, if such an event just occurred, lowers the requested output power to a minimum value.

Upon entry into this routine, execution proceeds to block 1710. This block calculates the amount of power which Processing Circuit 500 is requesting Commutator 400 to supply to the utility grid, i.e., grid voltage multiplied by requested current. Once this occurs, block 1720 executes to determine the actual power then being supplied by the PV panel, namely panel voltage multiplied by the panel output current. Thereafter, decision block 1730 determines whether the power requested by the microcontroller exceeds the output power then being generated by the panel multiplied by a predefined constant, k (which has been empirically determined to be 1.125). If this test is not satisfied, i.e., the requested power is less than or equal to k % (here 112.5%) of the power produced by PV panel, then no sudden shadow condition has occurred. In this case, decision block 1730 directs execution, via NO path 1733, to an exit point of this routine. Alternatively, if the requested power exceeds k % of the panel output power, then a sudden shadow condition is likely occurring. As such, decision block 1730 routes execution to block 1740 which reduces the requested output current from Commutator 400 to a pre-defined minimum value (Minimum_current). Thereafter, execution exits from routine 1700.

C. Variable Gain Current Control Loop

Figure 18:
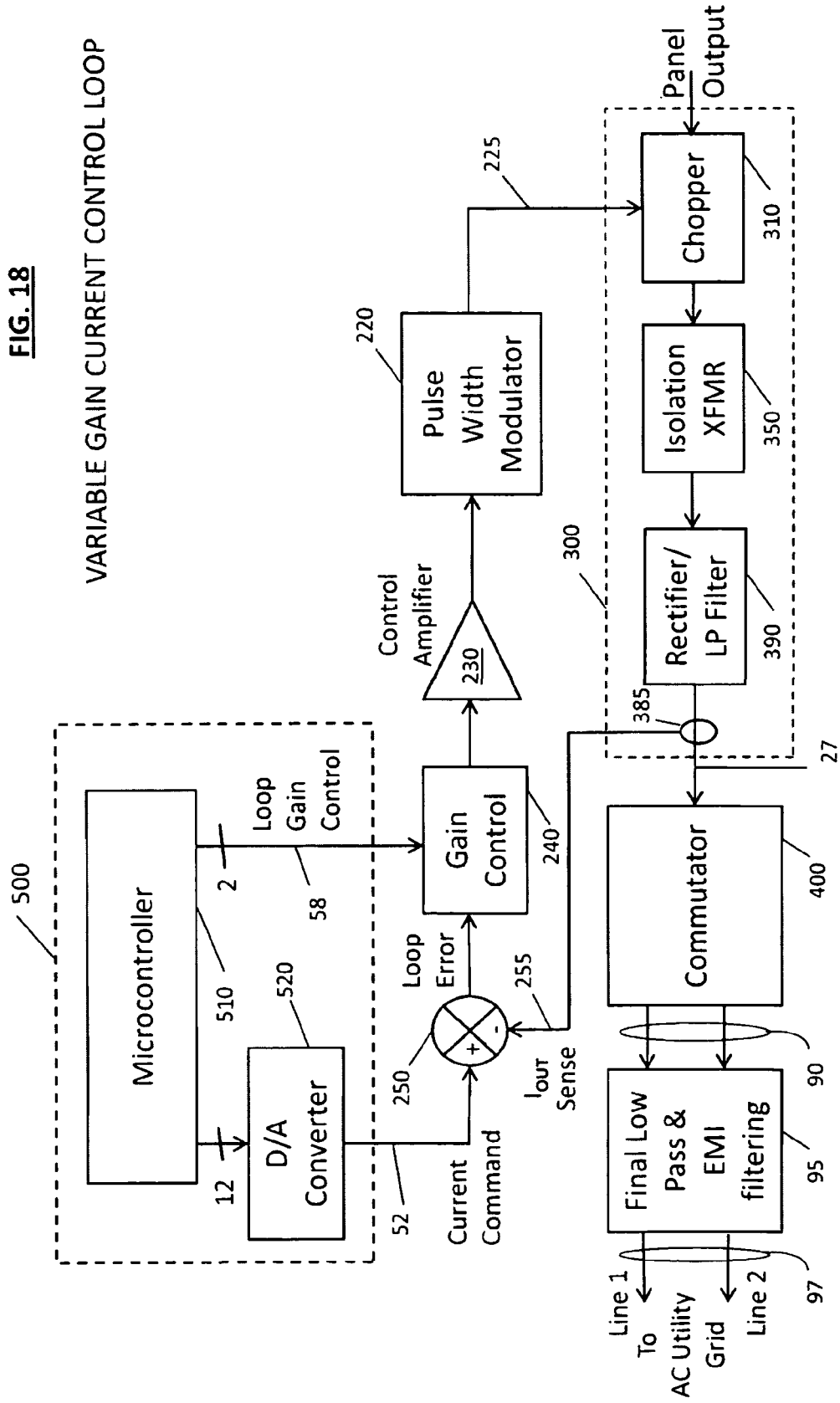
FIG. 18 depicts a block diagram of the components of microinverter 100, shown in FIG. 1, which collectively constitute a variable gain current control loop.

With all the discussion above in mind and for enhanced understanding, the variable gain current control loop that lies at the heart of the microinverter is depicted in FIG. 18.

This loop consists of Microcontroller 500 producing the Current Command and the Loop Gain Control Signal, both of which are in the analog domain. The Current Command constitutes one input to amplifier 250 (here shown as a subtractor). The output of amplifier 250, being the "Loop Error", is multiplied by a predefined factor (set by the Loop Gain Control signal) through Gain Control element 240. The output of element 240 is applied through control amplifier 230, as the error control signal, to Pulse Width Modulator 220. This modulator controls the amount of current produced by DC-to-Current Converter 300 (composed of Chopper 310, Isolation Transformer 350 and Rectifier/LP Filter 390), given the panel output current supplied as input, and ultimately produced by Commutator 400 and supplied, via Low Pass and EMI Filter 95, to the utility grid. The sensed output current is applied, via lead 255, as a negative feedback signal to amplifier 250, thus completing the control loop.

The Applicants believe that a large number of the presently inventive microinverters, probably well into the hundreds or thousands if not more, can be advantageously connected, in parallel and via a common point, to the utility grid, thus creating a rather large solar power installation. Each microinverter in such an installation operates totally independently of any other. The only limitation, if there is a practical one, on that number of microinverters that can be so connected is believed to be the degree of rigidity of the grid voltage, i.e., whether and, in terms of connecting successive microinverters, when (if at all) incrementally connecting an additional microinverter will impart a sufficiently adverse impact (should any actually occur) on the grid voltage. Furthermore, since each microinverter generates a sinusoidal waveform which is substantially free of distortion and much "cleaner" than the grid voltage itself, each additional microinverter connected to the grid has the beneficial effect of further suppressing voltage transients and other artifacts then appearing on the grid.

Although one embodiment which incorporates the teachings of the present invention has been shown and described in considerable detail herein, those skilled in the art can readily devise many other embodiments, modifications and applications of the present invention that still utilize these teachings.

We claim:

1. Apparatus for a microinverter which converts direct current (DC) input power into alternating current (AC) power for supply to an AC power grid, the apparatus comprising:
    a DC-to-current converter, connected to a DC power source and responsive to an error control signal, for producing a full-wave rectified output synchronized to an AC grid voltage then appearing on the power grid, the error control signal being responsive to a difference between a current command and an actual amount of AC output current then being supplied by the microinverter to the power grid;
    a commutator for converting the full-wave rectified output to the AC output current synchronized and phase-locked to the grid voltage, the commutator having switching components which are switched to a substantially on or off state substantially co-incident with zero crossings in the grid voltage, the commutator having a zero-crossing detector for detecting the zero crossings in the grid voltage so as to yield a zero crossing signal; and
    a controller, responsive to the zero crossing signal, for generating the current command and for synchronizing and phase-locking the operation of the commutator to the grid voltage.

2. The apparatus recited in claim 1 wherein the DC power source is a photovoltaic (PV) panel.

3. The apparatus recited in claim 2 wherein the DC-to-current converter comprises:
    a chopper circuit, responsive to the DC input power produced by the DC power source and controlled by a pulse width modulation control signal, for converting DC input current into a pulse width modulated current signal so as to form a chopped signal, wherein the amount of requested current determines a duty cycle of the chopped signal;
    an isolation transformer, having a first winding carrying the chopped signal and a second winding providing a pulse width modulated output current to a rectifier/filter circuit; and
    the rectifier/filter circuit for converting the pulse width modulated output current into full-wave rectified output current.

4. The apparatus recited in claim 3 wherein the apparatus further comprises:
    a pulse width modulator, responsive to the error control signal, for producing the pulse width modulation control signal having a controlled duty cycle determined by the error control signal; and
    the chopper circuit comprises:
    a first plurality of four chopper field effect transistors (FETs) configured in an H-bridge arrangement for chopping the DC input power into the pulse width modulated current signal; and
    a gate drive circuit, responsive to the pulse width modulation control signal, for providing gate drive signals to the FETs.

5. The apparatus recited in claim 4 wherein the commutator comprises:
    a second plurality of four commutator field effect transistors configured in an H-bridge arrangement, wherein each of two diagonally oriented pairs of said commutator FETs is switched on during corresponding half-cycles of the grid voltage; and
    a switch control circuit, responsive to the zero crossing detector and connected to each of the commutator FETs, for alternately switching each of the pairs of the commutator FETs on or off substantially co-incident with and phase-locked to corresponding zero crossings in the grid voltage.

6. The apparatus recited in claim 5 wherein the zero cross detector imparts a predefined amount of hysteresis to an output of the zero crossing detector provided to the switch control circuit such that the commutator FETs are switched off or on at a pre-defined period of time before or after each zero crossing in the grid voltage.

* * * * *